(12) United States Patent
Rössl

(10) Patent No.: US 11,763,713 B2
(45) Date of Patent: Sep. 19, 2023

(54) ELECTRONIC SHELF LABEL SYSTEM WITH SHELF EDGE STRIP SUB-SYSTEM

(71) Applicant: SES-Imagotag GmbH, Fernitz-Mellach (AT)

(72) Inventor: Andreas Rössl, Graz (AT)

(73) Assignee: SES-IMAGOTAG GmbH, Fernitz-Mellach (AT)

( * ) Notice: Subject to any disclaimer, the term of this patent is extended or adjusted under 35 U.S.C. 154(b) by 0 days.

(21) Appl. No.: 17/786,630

(22) PCT Filed: Dec. 23, 2019

(86) PCT No.: PCT/EP2019/086992
§ 371 (c)(1),
(2) Date: Jun. 17, 2022

(87) PCT Pub. No.: WO2021/129933
PCT Pub. Date: Jul. 1, 2021

(65) Prior Publication Data
US 2023/0022207 A1 Jan. 26, 2023

(51) Int. Cl.
*G09G 3/06* (2006.01)
(52) U.S. Cl.
CPC .......... *G09G 3/06* (2013.01); *G09G 2370/16* (2013.01); *G09G 2380/04* (2013.01)
(58) Field of Classification Search
CPC ... G09G 3/06; G09G 2370/16; G09G 2380/04
See application file for complete search history.

(56) References Cited

U.S. PATENT DOCUMENTS

| | | | |
|---|---|---|---|
| 6,266,052 B1 * | 7/2001 | Kayser | G06F 3/147 345/2.1 |
| 2011/0153112 A1 * | 6/2011 | Vander Hout | G07C 3/00 700/297 |
| 2012/0326846 A1 * | 12/2012 | Tseng | G06K 19/07707 340/10.3 |

* cited by examiner

*Primary Examiner* — Towfiq Elahi
(74) *Attorney, Agent, or Firm* — Dennemeyer & Associates, LLC

(57) ABSTRACT

An electronic shelf label system, wherein the system comprises a near-field communication, NEC for short, sub-system on a shelf edge strip of a shelving unit, which is characterized such that the shelf edge strip comprises a shelf edge strip controller, wherein the shelf edge strip controller comprises a first wireless communication module, which is designed for wireless communication according to a first communication method with an access point for the purpose of data transmission with a server of the shelf label system, and wherein the shelf edge strip controller comprises an NFC-enabled second communication module for NFC-based energy supply and communication with at least one NFC-enabled shelf label, which can be fastened to the shelf edge strip, and the shelf edge strip comprises at least one conductor loop constructed on it and connected to the second NFC-enabled communication module, wherein the conductor loop is used for NFC communication with the NFC-enabled shelf label, and wherein the shelf edge strip comprises a light-emitting unit, and the shelf edge strip controller is constructed for actuating the light-emitting unit as a consequence of the data transmission.

9 Claims, 6 Drawing Sheets

ELECTRONIC SHELF LABEL SYSTEM WITH SHELF EDGE STRIP SUB-SYSTEM

CROSS-REFERENCE TO RELATED APPLICATIONS

This is a 35 U.S.C. 371 National Stage Patent Application of International Application No. PCT/EP2019/086992, filed Dec. 23, 2019 which is hereby incorporated by reference in its entirety.

DESCRIPTION

Technical Field

The invention relates to an electronic shelf label system comprising a shelf edge strip sub-system.

Background

An electronic shelf label system for displaying information with the aid of electronic shelf label displays, referred to below as ESL system for short, wherein ESL stands for "electronic shelf label", comprising a proprietary shelf edge strip sub-system is known, for example, from international patent application WO 2017/153481 A1. In this known ESL system, such a shelf edge strip sub-system is installed on each shelf edge strip. In this sub-system, the shelf edge strip is equipped with electrical conductor tracks, with the aid of which the ESLs of the shelf edge strip are actuated by means of a management module of the shelf edge strip. The ESLs comprise on their rear side resilient contacts, with which the conductor tracks are contacted in order to connect the ESLs electrically to the management module. The ESLs in each case comprise an extremely energy-saving "electronic paper display" (shortened to EPD) as screen. This is therefore a reflective screen, which requires an external light source (e.g. simply ambient light), which irradiates the same, in order to make the image contents thereof visible. Such EPDs do not therefore have their own light source for active light emission.

However, such a shelf edge strip sub-system is relatively expensive because a multiplicity of in particular individual mechanical components must be provided in each ESL and in each shelf edge strip. These mechanical components are subject to natural wear. In addition, the mechanical components can become dirty or even damaged if not handled properly. This can lead to malfunctions during operation. The mechanical components are also associated with considerable additional outlay in both production and maintenance, which is necessary during operation to avoid the aforementioned problems.

The known system also has the limitation that the ESLs cannot be positioned or displaced along the shelf edge strip in any desired manner.

In addition, such EPDs are characterized by a relatively narrow viewing angle range measured to the surface normal of the screen surface of the EPD, which requires of the observer that they must be standing essentially precisely in front of the position of the ESL on the shelving unit, in order to be able to detect the image content. With the aid of such ESLs, it is consequently not possible to convey visually noticeable information, which should be seen by a person who is located e.g. at the entrance of an aisle, that is to say at a substantial distance laterally from the ESL and who is observing the EPDs positioned along the aisle at a relatively acute angle as measured with respect to the screen surface of the EPD. From this position, the viewing angle measured from the screen surface is usually too flat to be able to detect an image content at all visually in the case of looking into the aisle.

Even in the case of the most frontal observation possible of a group of such ESLs, the screen update rate of the installed EPDs is much too slow to provide dynamic information transfer along these ESLs. The individual updating of such an EPD may take namely between 20 seconds and even up to a minute and is usually associated with undefined intermediate states, which for the uninformed observer rather gives the impression of a fault and therefore does not contribute to useful information transfer for the observer.

The object of the invention is to provide an improved shelf edge strip sub-system and also art improved ESL system comprising such a shelf edge strip sub-system, in which the aforementioned problems are overcome.

SUMMARY OF THE INVENTION

This object is achieved by an electronic shelf label system, wherein the system comprises a near-field communication, NFC for short, sub-system on a shelf edge strip of a shelving unit, which is characterized such that the shelf edge strip comprises a shelf edge strip controller, wherein the shelf edge strip controller comprises a first wireless communication module, which is designed for wireless communication according to a first communication method with an access point for the purpose of data transmission with a server of the shelf label system, and wherein the shelf edge strip controller comprises an NFC-enabled second communication module for NFC-based energy supply and communication with at least one NFC-enabled shelf label, which can be fastened to the shelf edge strip, and the shelf edge strip comprises at least one conductor loop constructed on it and connected to the second NFC-enabled communication module, wherein the conductor loop is used for NFC communication with the NFC-enabled shelf label, and wherein the shelf edge strip comprises a light-emitting unit, and the shelf edge strip controller is constructed for actuating the light-emitting unit as a consequence of the data transmission.

The measures according to the invention are associated with the advantage that the shelf label to be attached to the shelf edge strip is completely free of electromechanical contacts and the problems associated therewith. In fact, in contrast to the known sub-system mentioned in the introduction, in which each shelf label must have a specific, proprietary electromechanical design, only a standardized NFC communication module must be provided in the shelf label in order to communicate contactlessly according to a (common) NFC specification or an NFC standard with the shelf edge strip controller (also referred to as shelf edge strip management module or shelf edge strip controller).

In particular, with the usually high number of installed shelf labels (sometimes up to several tens of thousands of units in larger supermarkets), the integration of this standardized NFC module has a considerable positive effect on the cost structure of the overall system. Thus, on the one hand, the shelf label can be produced much more cost-effectively and also operated without maintenance because electromechanical components, in particular those requiring maintenance, are avoided. There are of course additional costs for the specific shelf edge strip with its conductor loop, but these are not comparable with the production and operating costs which must be taken into account for the known shelf labels and the known shelf edge strips with their large number of electromechanical contact elements.

In contrast to the known sub-system, in the present case only one single shelf edge strip controller is to be provided per shelf edge strip, the design of which essentially consists in the two wireless communication modules being provided, wherein the first wireless communication module is designed for communication with the access point and the second wireless communication module is realized essentially as an NFC reader, the conductor loop of which is integrated in the shelf edge strip and conductor loop connectors are connected to the second communication module. However, in contrast to the known sub-system, this electromechanical contact only has to be made at the position of the NFC reader installed in the shelf edge strip controller, which is preferably integrated in the shelf edge strip (e.g. can be fastened thereon or installed or inserted therein) on the left or right end of same. This in turn means that the shelf labels can be positioned as desired along the shelf edge strip and also displaced or freely (continuously) shifted within the limitation of the position or extent of the conductor loop. It is thus possible to position the electronic shelf labels according to the actual positioning of the products, analogously to the way that paper-based shelf labels can be positioned.

In addition, the construction of the light-emitting unit, which is designed for actively generating and emitting light, directly on the shelf edge strip has turned out extremely positively, because with the aid thereof, active light emission can be carried out, which can trigger attention in people, which cannot be achieved using a conventional shelf label, particularly one equipped with a reflective screen. The light emission takes place in such a manner in this case that it can even be seen well from a side viewing direction. This may be realized e.g. due to the nature of the lamp used or else an optical system realizing the required wide beam angle, which is installed in the beam path of the lamp.

Furthermore, the dual functionality of the shelf edge strip controller comes into effect here, which on the one hand relates to the data transmission between the shelf labels which are fastened on the shelf edge strip, if applicable, in order to be able to use their different functionalities, if appropriate, and on the other hand relates to the data transmission for the purpose of actuating the light-emitting unit.

If the shelf edge strips are over-long, they can also be segmented and comprise a number of shelf edge strip controllers corresponding to the number of segments, with associated conductor loop(s) per segment (that is to say, at the location of the segments or inside the segments).

The NFC sub-system in the electronic shelf label system therefore assumes the role of an intermediary device in order to be able to address the shelf labels addressed by the server physically, that is to say, to be able to communicate with them and in combination therewith or independently thereof, to actuate the light-emitting unit. In the NFC sub-system, communication with the shelf labels therefore takes place in compliance with the NFC standard, the shelf labels being addressed by means of the server, and the NFC sub-system converting or applying this addressing, which is discussed below in different exemplary embodiments.

The data produced during communication can be status data, which for example are retrieved individually from the addressed shelf labels. However, this can also be command data representing commands which can be decoded and processed by the shelf labels and sent from the server to the addressed shelf label. These commands can, for example, effect the querying of the status data or else control other functions or functionalities of the shelf labels. However, the data can also be image content data, which are transferred to a shelf label with display medium, in order to display image contents there. Particularly in the present context, the commands sent by the server may be light-emitting unit control commands, which are used by the respectively addressed receivers (this may be the shelf edge strip controller itself or a shelf label addressed via the shelf edge strip controller) to actuate the light-emitting unit available there. These receivers (shelf edge strip controller or shelf label) are accordingly designed for receiving, decoding and executing these light-emitting unit control commands, wherein the light-emitting unit control commands must not only effect the switching on or off of the light-emitting unit, but rather may also contain arguments which define light emission cycles or light emission sequences, which are converted at the receiver.

The server can be a physical computer which is accommodated on the premises of a business and is responsible for the control and management of the shelf labels and their activities there and on which corresponding control software is executed. However, the server can also be understood as a cloud solution, with which the control software is executed in a computing centre spatially separate from the business. The control software creates, inter alia, a logical link between individual shelf labels and products or product groups and stores the same. In addition, it manages what is known as a planogram, which represents the spatial distribution of the shelf labels in the business premises. Furthermore, this control software can also perform logistics tasks. Also, using this control software, the aforementioned light-emitting unit control commands are generated and the various receivers are addressed with these light-emitting unit control commands. Furthermore, it is mentioned here with respect to the chosen definition ". . . wherein the shelf edge strip comprises a light-emitting unit . . . ", that this definition is to be understood such that the light-emitting unit can be constructed directly on the mechanical structure of the shelf edge strip or on the shelf edge strip controller or on a shelf label, as in the present case, even the shelf edge strip controller fastened to the shelf edge strip structure or else the shelf label fastened to the shelf edge strip structure are to be considered as part of the shelf edge strip.

Further particularly advantageous embodiments and developments of the invention result from the dependent claims and also the following description. In this case, features of one claim category can be developed in accordance with the features of the other claim category, so that the effects and advantages listed in connection with the one claim category are also present for the other claim categories.

The light-emitting unit can for example be formed by an LCD display, which comprises its own light source for generating light. However, it has proven particularly advantageous if the light-emitting unit is formed by at least one light-emitting diode, shortened to LED. This realization is relatively inexpensive and additionally offers the advantage that the LED usually radiates its light into a wide spatial region, even to the side. Such an LED can additionally also readily be positioned in such a manner in a device, such as for example with its electrical contacts soldered on a printed circuit board, that it emits its light through a housing opening of the device or through a viewing window of the housing. The fastening and the positioning in the housing takes place in this case solely by means of the electronic contacts, which is cost-effective and efficient.

According to an exemplary embodiment, the shelf edge strip controller may comprise the light-emitting unit. Using this design, a light signal can be emitted at least from the position of the shelf edge strip controller, which has a meaning for the observer, which relates to the entire shelving unit or the relevant shelf, to the shelf edge strip of which the shelf edge strip controller is localized.

Furthermore, the shelf edge strip may comprise the light-emitting unit and the light-emitting unit may be electrically conductively connected to the shelf edge strip controller for the purpose of actuation. Using this embodiment, it is possible to install the e.g. LED at any desired position along the shelf edge strip and to emit the light signals as a consequence of this position. The position of the LED can in this case be chosen in such a manner that the LED is not covered by a shelf label which is to be attached to the shelf edge strip. Also in the present case, light signalling can be realized, the meaning of which relates to the entire shelf edge strip, but is present in a very punctiform manner at the location of the LED.

According to a further embodiment, the light-emitting unit can be constructed as a light-emitting diode strip and extend along the length of the shelf edge strip. This LED strip usually comprises a multiplicity of LEDs along its entire length and it may be positioned e.g. at an upper or lower edge of the shelf edge strip, preferably in such a manner that the LEDs thereof are not covered by the shelf labels that are to be fastened to the shelf edge strip. Using this embodiment, light signalling can be created under the actuation of the shelf edge strip controller, which highlights the entire shelf edge strip.

According to a further embodiment, the light-emitting diode strip comprises light-emitting diodes that can be actuated individually and the shelf edge strip controller is designed to actuate the light-emitting diodes individually. Using this embodiment, light signallings can be achieved, which give the observer the impression that they are moving along the shelf edge strip or are running to a point on the shelf edge strip, because the moving light signals move towards this point from both sides. All of these scenarios relate to a coordinated actuation of the individual LEDs of the LED strip, wherein the actuation takes place by means of the shelf edge strip controller.

According to a further embodiment, the NFC-enabled shelf label is fastened to the shelf edge strip corresponding to the conductor loop and the shelf label comprises the light-emitting unit, wherein the shelf label is designed in such a manner that the actuation of the light-emitting unit takes place in the course of an NFC communication with the shelf edge strip controller. In this configuration, the relevant shelf label is addressed from the server and the light-emitting unit control command is transferred via the shelf edge strip controller to the addressed shelf label in the NFC sub-system and executed there. At the shelf label, the light generated with the aid of the LED is preferably emitted at the front side, which runs substantially parallel to the shelf edge strip and on which the screen of the shelf edge strip is also provided. Likewise, the upper side or the underside of the shelf label housing can also be used for this.

Particularly preferably, the shelf label comprises a reflective screen in addition to the light-emitting unit. Thus, using one and the same shelf label, it is possible in as energy-saving a manner as possible to present information about products on the shelving unit and at the same time generate active light signalling.

In the system in question, different identifiers (identification data) are used, which are used for the unique identification of the devices integrated in the system, specifically as follows:

An access point identifier uniquely identifies the respective access point. The access point identifiers of the access points existing in the system are known to the server, that is to say, stored there, because all communication with individual shelf labels flows via the respective access point to which the relevant shelf label is wirelessly assigned, that is to say in which the shelf label is registered.

A shelf label identifier uniquely identifies the respective shelf label for the server. In order to be able to handle addressed data traffic with the shelf labels, the server therefore also manages the shelf label identifier, unique to it, of each shelf label in use in the business. In particular, the server stores the assignment between the respective access point and the shelf labels assigned to this access point.

A shelf label NFC identifier uniquely identifies each shelf label in the context of NFC communication and is used in the NFC sub-system during such NFC communication with an NFC reader.

A reader NFC identifier is the counterpart on the side of an NFC reader, which is installed in the shelf edge strip controller, and uniquely identifies the NFC reader for NFC communication with one of the NFC-enabled shelf labels in the NFC sub-system.

A controller identifier uniquely identifies each shelf edge strip controller and is required e.g. during the registration of the relevant shelf edge strip controller at one of the access points, in order to communicate subsequently with this access point wirelessly and/or in order to be able to identify the shelf edge strip controller uniquely with respect to the server and subsequently to be able to address the same.

It should already be mentioned at this point that, according to a first embodiment, it is sufficient for the server merely to know the shelf label identifier in order to address the relevant shelf label, whereas, according to a second embodiment, it is additionally necessary to know a controller identifier linked to the relevant shelf label identifier in order to address the shelf label indirectly via the shelf edge strip controller. This is discussed further in detail below.

The electronic shelf label can provide a wide variety of functionalities or fulfill a wide variety of functions. The shelf label can be equipped, configured or accordingly designed, e.g. to detect environmental parameters such as e.g. for temperature or moisture detection, or as an input element for receiving an input interaction of a user (e.g. detecting a fingerprint or a key press) or else as a display medium for presenting information for the user, namely as a shelf label display with a screen and/or with a light-emitting unit. In any case, the shelf label is designed such that it can be attached mechanically to the shelf edge strip in question and is supplied there with energy and with data during NFC communication in the manner described in detail in the following.

The NFC-enabled shelf label comprises a standardized, first NFC interface. This is associated with two advantages. This NFC interface is used on the one hand for local energy transmission on the shelving unit or on the shelf edge strip, specifically for a single shelf label or equally a group of shelf labels attached to this shelf edge strip, and on the other hand for bidirectional local contactless communication of data directly there. The shelf labels can therefore be supplied with energy contactlessly without additional wiring or additional power supply units, etc. At the same time, problems in wireless traffic, which are caused by other radio systems in a business, are also avoided because they are usually located far away from the shelving units where the shelf label is installed and therefore have hardly any or no influence at all on the local energy transmission and also communication between the communication partners (NFC-enabled shelf label and NFC reader with its conductor loop(s)) positioned very close to each other directly on the shelf edge strip.

As mentioned, NFC stands for Near Field Communication, and the applicable standards are e.g. ISO/IEC 13157, -16353, -22536, -28361, etc.

The shelf label, when configured as a shelf label display, can comprise an energy-saving display unit such as e.g. an LCD display. In particular, however, the technology that is used is based on electronic ink or electronic paper technology, as explained at the start of this patent application. A display unit of this type therefore comprises the reflective screen, also termed electronic paper display, abbreviated EPD, in technical jargon, and is realized with the aid of "electronic paper", abbreviated to "e-paper" or "e-ink". These terms substantially stand for the principle of an electrophoretic display which contains e.g. positively charged white particles and negatively charged black particles in a transparent, viscous polymer. By briefly applying a voltage at electrodes, between which the medium made up of particles and polymer is arranged, either the black particles are placed in front of the white particles or vice versa in the viewing direction. This arrangement is then maintained for a relatively long time (e.g. a few weeks) without further energy supply. If the display is segmented accordingly, e.g. letters, numbers or images can be realized with relatively high resolution in order to display said information. Such a reflective screen can however also be realized with the aid of other technologies, which are known e.g. under the term "electrowetting" or "MEMS". The screen can be designed e.g. as mentioned for black and white display, for greyscale display, for black, white and red display or else for black, white and yellow display. Future developments, which enable a full-colour or even multi-colour display, should also be included. Such a screen is very generally a reflective, that is to say passive, non-self-illuminating screen, in which the—relatively static—information display is based on light generated by an external (artificial or natural) light source (ambient light) shining onto the screen and being reflected from there to the observer. Such a display unit manages without energy consumption, apart from changes to the image content.

Exactly like the other electronic components of the shelf label, upon receipt of an NFC wireless signal, which is generated by the NFC reader, by the first NFC interface, this display unit is supplied with the aid of the first NFC interface, with energy on the one hand and data on the other hand, which can represent commands for controlling the display unit or else image contents. During energy supply via the NFC interface, the said data can also be transmitted via this first NFC interface, said data being processed by the display unit to the effect that the image content of its screen changes. After the image content has finished changing, corresponding status information representing the successful change of the Image content can also be output by the display unit via the NFC interface. After the image content has finished changing, where applicable also after the status information has been output, the energy supply via the NFC interface can be terminated, e.g. by adjusting the generation of the NFC wireless signal, after which the image content of the screen remains unchanged until the next desired change.

The use of said technologies in particular allows the shelf label to be realized in particular as a shelf label display without its own energy supply such as a battery or a rechargeable battery for example, which are both relatively expensive. For the purposes of maintenance or replacement of the battery or rechargeable battery, a conventional shelf label must also be designed such that said energy storage devices are replaceable. Where necessary, only a capacitor for short-term, temporary smoothing or stabilization of the internal supply voltage is still used in the shelf label. The shelf label is therefore designed such that its electronics for communication or for updating the screen content or for receiving user interaction or for detecting environmental parameters, in particular its electronic controller, is only active when it is supplied with the aid of the NFC reader of the shelf edge strip.

However the shelf label can also comprise—in addition to one or more smoothing capacitors and/or backup capacitors which may be provided—a long-term energy storage device for its at least longer lasting temporary autonomous energy supply. This long-term energy storage device can be realized, for example, by a replaceable or else chargeable battery. Preferably, however, the long-term energy storage device is realized by a "supercapacitor", "supercap" for short, also referred to as an "ultracapacitor". The advantage of such a capacitor is that it is a high-power capacitor with a capacitance which is much higher than conventional capacitors, but the capacitor has lower voltage limits and bridges the gap between electrolyte capacitors and chargeable batteries. It typically stores 10-100 times more energy per unit volume or mass than electrolyte capacitors, can receive and output charge much faster than batteries, and tolerates many more charging and discharging cycles than rechargeable batteries. The long-term energy storage device for the shelf label is supplied or charged by the NFC wireless signal output via the conductor loop, as long as the NFC wireless signal is present. Charging can take place directly with the aid of a voltage generation stage, which generates a supply voltage from the received NFC wireless signal, or with the aid of the shelf label's own charging electronics. After the NFC wireless signal has gone, the electronics of the shelf label can be supplied with the aid of the long-term energy storage device at least for a much longer time than would be the case with a backup capacitor or a smoothing capacitor. This allows commands or even data itself to be processed in the absence of the NFC wireless signal just like the provision of other functionalities, such as the processing of a user input or else the detection of a temperature in a time period in which the NFC wireless signal is not present. In particular, this long-term energy storage device, preferably realized as a supercap, in a shelf label, which comprises the light-emitting unit, allows the operation of the light-emitting unit in time intervals in which the NFC signal is not present.

The housing of the shelf label can be completely and permanently encapsulated, because it is no longer necessary to replace the energy storage device, and therefore it can only be opened for recycling purposes (e.g. with a special tool).

A shelf label which is reduced to a few, absolutely necessary electronic components and is therefore also extremely inexpensive can thus be realized. This extremely reduced shelf label only needs still to have a basic functionality, such as e.g. standardized NFC communication with standardized energy supply during the NFC communication, which is realized with the aid of a commercially available NFC module.

Updates to the screen of the energy-saving display unit and status report relating thereto or else the transmission of data relating to a user interaction or else an environmental parameter, just like the actuation of the light-emitting unit, are not made directly by the shelf label display in communication with an access point, but rather handled by the interposed shelf edge strip controller, which for its part is in wireless contact with the access point, which is discussed in detail in the following.

As mentioned, a conductor loop is formed on the shelf edge strip, and the loop connectors of this conductor loop are connected to the NFC reader of the shelf edge strip controller. The conductor loop therefore forms a constituent of the NFC reader for contactless NFC communication with the NFC-enabled shelf label, which is mounted on the shelf edge strip corresponding to the conductor loop. In this case, "contactless" means that it can take place with the aid of an inductive coupling between two adjacently located conductor loops or coils. To this end, the shelf label also comprises a conductor loop consisting of a single loop or a plurality of windings, that is to say, a coil. Signal transmission from the NFC reader of the shelf edge strip controller to the NFC-enabled shelf label can however also take place by sending the NFC wireless signal and receiving with an antenna of the shelf label. To this end, the NFC reader comprises a transmitter with an antenna configuration which is provided substantially by the conductor loop. To a person skilled in the art, it is a matter of routine that an antenna matching network and a transmission stage, a modulator and a demodulator, etc. are present. These components and their interconnection on analogue antenna components can be found in the relevant "application notes" of NFC reader IC manufacturers.

To receive the NFC signal, the shelf label—as mentioned—also comprises a conductor loop consisting of a single loop or winding or a multiplicity of windings, that is to say a coil. This coil is a constituent of the first NFC interface of the shelf label. In this case too, the specific implementation can be found in the relevant "application notes" of the manufacturer of NFC-ICs.

Furthermore, "corresponding to" means that the shelf label is positioned adjacent to the area spanned by the conductor loop and is located there essentially inside a zone delimited by the conductor loop. The conductor loop itself may be designed to be e.g. visible in the plane of the shelf edge strip or covered by a protective material (strip). If the shelf label is inserted into the shelf edge strip (that is to say, mechanically fastened there), the conductor loop or coil installed in the shelf label is automatically located in the zone usable for the inductive coupling between the two conductor loops or coils positioned next to each other. Preferably, in the shelf label inserted into the shelf edge strip, the areas spanned by the two conductor loops or coils (on one side belonging to the shelf edge strip and on the other side belonging to the shelf label) are oriented parallel to each other and at a spacing of less than one millimetre to a few millimetres. To avoid impeding transmission of the NFC wireless signal, the shelf edge strip itself is manufactured from a suitable material, preferably plastic. It can also comprise a shielding plate on its rear side to obtain a defined attenuation of the antenna resonant circuit of the NFC reader, which allows the antenna resonant circuit to be tuned to this defined environment and thus makes a considerable contribution to communication reliability, since metallic loads in the environment of the NFC reader can thus be substantially disregarded.

The perimeter of the conductor loop of the shelf edge strip can extend, for example, along the entire length of the shelf edge strip and at least along part of the entire height of the shelf edge strip. To realize the conductor loop, a single conductor track running round or a conductor track running around multiple times in a coil-like manner, that is, comprising multiple windings, can be provided. Multiple conductor loops or coils, which are connected to the NFC reader, can also be installed along the shelf edge strip.

In this connection, it can be advantageous that the NFC reader is designed to multiplex the conductor loops. In this case, only one single conductor loop, which is electronically selected, is ever used to transmit the NFC wireless signal. It has proven particularly advantageous when exactly one single shelf edge strip controller with NFC reader is used per shelf edge strip, because this allows the use of an NFC reader without a conductor loop multiplexer. This allows a conventional NFC IC to be used for energy supply for an entire shelf edge strip.

The energy supply of the shelf edge strip controller of the shelf edge strip can be realized in different ways. Thus, the shelf edge strip controller can be supplied using a separate power supply unit. A group of the shelf edge strip controllers can also be supplied using a central power supply unit. Particularly preferably, however, the shelf edge strip controller is designed to be supplied with energy in a wireless manner. This requires a supply station, which for its part is designed as a wireless energy source for the in particular directional wireless energy supply of the shelf edge strip controller. With the aid of the supply station (also termed a supply transmitter), therefore, a contactless, targeted energy transmission to the shelf edge strip controller takes place. This allows a substantially cable-free supply infrastructure for the shelf labels fastened to the shelf edge strip on the one hand and also for the shelf edge strip controller provided for supplying the shelf labels on the other hand. In fact, the fitter of the system is spared the cabling between the actual energy source and the respective shelving unit. These circumstances allow the shelving units to be positioned substantially as desired within the business and the shelf edge strips to be positioned as desired and simply on a wide variety of shelving units and also to be exchanged between the shelving units. This type of energy transmission and the technology on which it is based is referred to using the term "power over WiFi". Wireless energy sources equipped with this technology (supply transmitters) can be installed for example on the ceiling of business premises and selectively supply, within a range of up to a maximum of 10 metres, the shelf edge strip controllers assigned to the respective shelf edge strips and located within said range with the aid of powerful, that is, focussed wireless signals directed towards said shelf edge strip controllers.

In addition to the NFC interface (NFC reader) which is provided for communication with the NFC-enabled shelf labels, the shelf edge strip controller comprises a further interface, specifically the already mentioned first communication module, which is intended for communication with the access point. This further interface is designed for wireless communication and accordingly comprises a wireless transceiver for communication in the 2.4 GHz wireless band, for example. The transceiver is an electronic system which is designed both to receive and transmit wireless signals and in which the required functionality for modulating a carrier signal and demodulating receive signals is provided. The transceiver can be realized by means of active and passive electronic components or modules, such as a matching network for an antenna and antenna configuration etc., with the aid of which analogue signals can be converted into digital signals and vice versa. The transceiver can be coupled to a logic stage. The logic stage can be realized for example completely by means of discrete hardware or comprise a microprocessor and memory modules or a microcontroller with integrated memory modules so that software stored in the memory modules can be executed. The shelf edge strip controller can receive a wireless signal from the access point with the aid of its transceiver, process receive data contained in the wireless signal with the aid of the logic stage, and where necessary generate response data with the aid of the logic stage and output said response data again via the transceiver to the access point as a wireless signal. The shelf edge strip controller thus realizes in communication terms a "gateway" for all the shelf labels mounted on the relevant shelf edge strip.

The access point is equipped analogously to this in order to communicate wirelessly with the shelf edge strip controller. Wireless traffic can take place according to WLAN, ZigBee or else Bluetooth communication protocols.

Particularly preferably, the access point and the shelf edge strip controller are designed for wireless communication according to a (proprietary) time slot communication method; wherein in the time slot communication method, a number of time slots in a repeating sequence per time slot cycle are available for communication, wherein each time slot is preferably identified by a unique time slot symbol.

A proprietary time slot communication method is preferably used for this, such as that known in principle from WO2015/124197, pages 2 to 4 and FIGS. 1-8C with the associated description, the specific disclosure of which is hereby incorporated by reference, wherein in the present case it is not the shelf labels but the shelf edge strip controller which is designed for communication with the access point according to this time slot communication method, specifically as follows.

According to this proprietary time slot communication method, the access point communicates with a number of shelf edge strip controllers such that a number of time slots in a constantly (continuously) repeating sequence per time slot cycle are available for communication, and each time slot is identified uniquely by a unique time slot symbol and thus can be distinguished from other time slots solely by the time slot symbol. According to the method, the access point sends, for the currently present time slot, a synchronization data signal comprising the time slot symbol at the start of the respective time slot. The shelf edge strip controllers know this time slot communication method system and are designed to change, at a wake-up time, from an (extremely energy-saving) sleep state, in which they are not ready to receive wireless signals, into an active state, in which they are e.g. ready to receive wireless signals, and to receive the synchronization data signal in the active state, and, when the received time slot symbol indicates a time slot defined for the respective shelf edge strip controller, to define a new wake-up time, which corresponds to the next occurrence of the time slot defined for this shelf edge strip controller, in a time slot cycle following the currently present time slot cycle.

This has the advantage that a synchronism between the access point and one of the shelf edge strip controllers can be detected, maintained and ensured during operation of the system in the most simple and yet extremely robust manner. This also improves the energy efficiency of all the shelf edge strip controllers which are logically assigned to a single access point, because the check for synchronism takes place immediately at the start of the time slot. The further behaviour of the shelf edge strip controller depends on whether one of the shelf labels installed on its shelf edge strip or the shelf edge strip controller itself is addressed within the time slot defined for it.

In principle, the synchronization data signal could be formed exclusively by the time slot symbol, and further communication parameters required for communication with the access point (or server), such as e.g. address data for addressing or command data for transmitting commands, could be separate from the synchronization data signal. However, since the time slot symbol is preferably an extremely compact indicator for synchronizing communication in the system, that is to say, can be formed e.g. by the serial number of the time slot, it is clear that further information can be embedded in the synchronization data signal in addition to the time slot symbol, which is discussed below.

It is therefore advantageous if the access point is designed to embed in the synchronization data signal address data, with the aid of which a number of shelf edge strip controllers and/or shelf labels per time slot can be addressed individually.

Analogously to the previous statements relating to embedding address data, there is a further considerable contribution to system efficiency when the access point is designed to embed in the synchronization data signal command data which cause the addressed device (shelf edge strip controller and/or shelf labels) to execute a command. However, a command can also, for example, be transmitted to all the devices assigned to a certain time slot without individual addressing and can then be executed by a relatively large group of devices, for example all of them.

In principle, the shelf edge strip controller or the shelf label could execute a standardized (predefined) task merely by detecting its individual addressing, without an explicit command having to be received. However, it has proven particularly advantageous when address data are transmitted to address an individual shelf edge strip controller or an individual shelf label and command data are transmitted to transmit a command to the said shelf edge strip controller or the said individual shelf label, and the addressed device radio tag is designed to evaluate the command data and execute the command when it is addressed individually with the aid of the address data. A command can thus be transmitted individually in a sometimes relatively large group of shelf edge strip controllers or shelf labels.

It is therefore initially completely sufficient for each shelf edge strip controller involved in communication with the relevant access point, that is to say, is assigned to it wirelessly e.g. by initial registration, to know the time slot symbol which indicates the time slot defined for it. Each of the shelf edge strip controllers therefore orients itself individually by the occurrence of a time slot symbol relevant for it, identifies the time slot symbol relevant for it, and defines its next wake-up time in order to remain synchronous with the timing of the time slot communication method predefined by the access point, this timing being known to the shelf edge strip controller, as mentioned. In this case it is completely sufficient for the time slot symbol to identify the respective time slot uniquely, e.g. with a time slot identifier that is individual for each time slot. Further information encoded in the synchronization data signal, as often occurs in other methods, is not necessary here to operate the shelf edge strip controllers synchronously with the access point to which they are wirelessly assigned. The relevant shelf edge strip controller therefore establishes its synchronism with the access point solely by the fact of detecting the time slot symbol, which occurs at the time expected by it or within an expected time window and indicates the time slot intended for it.

After the shelf edge strip controller has established its synchronism as explained above, it is in principle sufficient for it to change back into the sleep state, because the next wake-up time is automatically known by means of the time slot pattern, known to it, of the time slot communication method. The definition of the new wake-up time can thus be limited to, e.g. a time control stage (e.g. a timer) of the shelf edge strip controller being restarted with the timing parameters already used previously to change from the sleep state to the active state. The affected shelf edge strip controller can then change back into the sleep state and stay there until, triggered by the time controller, a wake-up and a change from the sleep state to the active state is carried out again at the new wake-up time in the next time slot cycle. However, the shelf edge strip controller does not necessarily have to stay in the sleep state for the rest of the time slot intended for it, but can also process further tasks, such as e.g. NFC communication with one of the shelf labels or the actuation of the light-emitting unit, in its active state during the time slot or also during the time slot cycle. The previously explained time controller then operates in the background independently of the other, further activities of the shelf edge strip controller. The new wake-up time can be defined by defining an absolute or relative time specification, for example relatively to the time of occurrence of the synchronization data signal or relatively to the time at which the sleep state is assumed again after the active state, or else relatively to the time at which the end of the synchronization data signal occurs. However, the definition of the new wake-up time can also be understood such that the duration of the sleep state following the active state in which the time slot symbol was received or else the sum of the durations of the sleep state and of the active state or else the sum of the durations of multiple such state sequences defines the new wake-up time.

Since each shelf edge strip controller operates its own time control stage and exemplary scattering of the behaviour of the respective electronic components cannot be ruled out, the definition of the new wake-up time can also include compensation for a drift of the time basis present individually for each shelf edge strip controller. To this end, a time difference between the expected occurrence of the synchronization data signal with the time slot symbol which indicates the time slot defined for the respective NFC reader and the actual occurrence can for example be measured in the shelf edge strip controller and taken into account in the time control stage to correct its timing. However, the compensation is only used when synchronism is established.

If, however, a different time slot symbol instead of the expected time slot symbol was received, there is no synchronism and the shelf edge strip controller must carry out a re-synchronization. To this end, such an asynchronous shelf edge strip controller does not change periodically, as would be the case in the synchronous state, but rather changes from its sleep state into its active state e.g. a single time at any desired time and remains in this active state in the ready-to-receive state. If nothing was received within a certain time period, for example a time slot duration, it changes back into the sleep state and repeats the receive attempt at another time. As soon as a synchronization data signal is received, the time slot symbol is evaluated, that is to say, checked. The time slot symbol received indicates with the highest probability a time slot which is not defined for the shelf edge strip controller in question, which is established autonomously by the shelf edge strip controller. The shelf edge strip controller knows the system of the occurrence of the time slot symbols and can automatically decide, after evaluating the received time slot symbol, whether it can expect the time slot defined for it in the present time slot cycle (first case) or not until the following time slot cycle (second case). For the first case, the shelf edge strip controller is designed to define a new wake-up time corresponding to the next occurrence of the time slot defined for it, in the currently present time slot cycle. By evaluating the received time slot symbol and knowing the system of the occurrence of the time slot symbols, the shelf edge strip controller establishes that the time slot defined for it will still occur in the currently present time slot cycle. For the second case, the shelf edge strip controller is designed to define a new wake-up time corresponding to the next occurrence of the time slot defined for it, in the time slot cycle following the currently present time slot cycle. By evaluating the received time slot symbol and knowing the system of the occurrence of the time slot symbols, the shelf edge strip controller establishes that the time slot defined for it will no longer occur in the currently present time slot cycle because it has already occurred in the past within this time slot cycle. As explained above with regard to the synchronous state, the said time controller is also used for this type of definition of the new wake-up time, wherein the time controller is operated with the timing parameter with which the desired entry into the synchronous state is achieved. The timing parameter to be selected results for the shelf edge strip controller from the inherent knowledge of the time slot communication method used. The timing parameter is therefore defined by the electronics of the shelf edge strip controller, which has knowledge of the parameters of the time slot communication method.

These parameters can be requested from the access point by the shelf edge strip controller or transmitted to it when the shelf edge strip controller is registered at the respective access point, or can already be programmed into the shelf edge strip controller beforehand. In both cases, it is expedient if the shelf edge strip controller has a storage stage for storing the parameters of the time slot communication method, and the shelf edge strip controller is designed to access and take into account these parameters for the purpose of defining the new wake-up time. The parameters can represent all the details of the timing of the time slot communication method, such as parameters relating to time sequences for communicating between the access point and the shelf edge strip controller, parameters relating to predefined times or time segments, but also parameters relating to the basic structure of the time slot communication method such as e.g. the number of time slots, the duration of a time slot, the duration of the time slot cycle, or else as parameters, the explicitly specified time slot symbols for identifying the individual time slots or else algorithms for calculating the time slot symbols. With the aid of these parameters, an asynchronous shelf edge strip controller can detect autonomously, that is to say, automatically for itself without external assistance, whether, on the basis of the time slot symbol just received, the time slot defined for it can still be expected within the currently present time slot cycle or whether the time slot defined for it already belongs to the past in the present time slot cycle and therefore the next time slot defined for it will not occur until the next time slot cycle. The shelf edge strip controller in question calculates the new wake-up time in the active state, changes to the sleep state, and changes to the active state at the calculated wake-up time, receives the time slot symbol of the time slot defined for it and is then back in the synchronous state. If no further activities are expected of it in the present time slot, it changes immediately to the sleep state and then does not change back to the active state until the next time slot cycle, in order to receive the synchronization data signal in the time slot defined for it.

The fact that the relevant shelf edge strip controller now knows about the time slot symbol which indicates the time slot defined for it, that is to say, knows exactly when it must be in the active state to be available for communication, arises in different ways and ultimately depends on which of the two embodiments explained below is used.

According to a first embodiment, the shelf edge strip controller stores a data structure representing an assignment of a shelf label fastened to its shelf edge strip to one of the time slots, the shelf edge strip controller being designed to check the time slot to which a shelf label is assigned according to the data structure as to whether the shelf label fastened to its shelf edge strip is addressed by the server.

In the present case, the data structure is composed of the shelf label identifier, which is also known to the server and used by it for addressing, and the associated time slot symbol. They form a data pair of the data structure for each shelf label fastened to the shelf edge strip of the shelf edge strip controller. If a plurality of shelf labels fastened to this shelf edge strip are assigned to a certain time slot, which is quite possible technically, their shelf label identifiers can also be assigned to the respective time slot symbol in a grouped manner, or else separate data pairs consisting of the respective shelf label identifier and the relevant time slot symbols can be stored in the data structure. The data structure also has a shelf label NFC identifier for each shelf label identifier defined for addressing by the server, said shelf label NFC identifier being used in NFC communication between the NFC reader of the shelf edge strip controller and the shelf label to address the NFC-enabled shelf label on the NFC communication level.

Furthermore, the shelf edge strip controller is designed to transfer data between the addressed shelf label and the access point when there is a positive check result. Depending on the design variant, these data can then be transferred initially to the shelf edge strip controller in the time slot defined for the addressed shelf label according to the data structure or else distributed over multiple additional time slots. Depending on whether the data are time-critical data, these data can then be communicated with the relevant shelf label in real time, that is to say in the respective time slot, within the NFC sub-system. If the data are not time-critical, the data can be initially received in the relevant time slot and buffer-stored in the shelf edge strip controller during a planned transfer to the shelf label and then transferred to the shelf label in NFC communication separately from the timing of the time slot communication method. The same applies for data which are retrieved by the shelf label. These data can also be initially collected and buffer-stored within the NFC sub-system, that is to say, by the NFC reader, separately from the time slot communication method and then output to the access point via the shelf edge strip controller in the provided time slot.

The data can be command data or else content data. Content data are often coupled to command data. A display control command with image data forming content data can thus be transferred to a shelf label with a display unit. Likewise, with the aid of a query command, temperature data can be requested from an addressed shelf label, which comprises a temperature sensor, etc. In this manner, the light-emitting unit control command can also be selectively transmitted to the shelf labels.

The design of the shelf edge strip controller in the present case is characterized in that the shelf edge strip controller, as mentioned, has its energy-saving sleep state, in which it is not ready to communicate with the access point, and its active state, in which it is ready to communicate with the access point, and in that the shelf edge strip controller is designed to change from the sleep state to the active state promptly upon the occurrence of the time slot to which a shelf label is assigned according to the data structure. This means that the shelf edge strip controller can also be in its active state multiple times within a time slot cycle for the purposes of checking synchronism and addressing. Specifically, the number of these active states depends on the number of time slots to which shelf labels mounted on the relevant shelf edge strip are assigned.

The data structure therefore allows the synchronous shelf edge strip controller to be in the active state at the time of occurrence of the respective time slot symbol and to check whether one or more of its shelf labels which is/are recorded in its data structure is/are addressed by the server with the aid of the address data.

In the present case, it is implemented on the server side that the server stores an individual shelf label identifier of each shelf label in a database and addresses the respective shelf labels directly using the shelf label identifier. As mentioned above, the access point identifier is also used for this, to address the access point via which the relevant shelf label can be wirelessly addressed.

Furthermore, it is provided that each of the shelf edge strip controllers is also assigned to a time slot and therefore can also be addressed directly and supplied with commands, such as e.g. the light-emitting unit control command, in order to actuate either the light-emitting unit installed on the shelf edge strip controller or the light-emitting unit installed on the shelf edge strip, which is directly connected to the shelf edge strip controller via electrical contacts or plug connectors.

A significant advantage of this embodiment consists in that it is backwards-compatible with that in the aforementioned WO2015/124197. Accordingly, the software application running on the server does not have to have any knowledge of the NFC sub-system, as both the shelf labels and the shelf edge strip controllers are assigned to time slots and can be addressed in the respective time slot. However, this embodiment has a significantly better system energy balance than the system disclosed in WO2015/124197 even from an installation of two or more shelf labels per shelf edge strip, the two or more shelf labels being assigned to a single time slot. In the system of WO2015/124197, each shelf label must namely be in the active state at least once per time slot cycle in order to verify its synchronous state and consequently to check whether it is addressed. By contrast, in the present embodiment, only the shelf edge strip controller to which the said two of the plurality of shelf labels are assigned has to be in the active state in the relevant time slot in order to verify the synchronism and check whether one or more of the shelf labels is addressed.

In contrast to the previously explained embodiment, according to a second embodiment, only the shelf edge strip controller itself is assigned to one of the time slots and it stores a data structure which represents the shelf labels fastened to its shelf edge strip, and the shelf edge strip controller is designed to check the time slot to which it is itself assigned as to whether the shelf label fastened to its shelf edge strip is addressed by the server.

In the present case, however, the addressing carried out by the server relates to the primary, that is to say, direct addressing of the shelf edge strip controller, via which one of its shelf labels is then addressed indirectly. The indirect addressing of the shelf label is transmitted to the addressed shelf edge strip controller e.g. in the form of the command data, which was mentioned in connection with the explanation of the time slot communication method and which represents an indirect addressing command which contains, as argument, the shelf label identifier of the shelf label to be indirectly addressed, in the time slot to which the shelf edge strip controller is assigned.

In the present case, the data structure is composed of the shelf label identifier of the shelf labels which are fastened to the shelf edge strip of the relevant shelf edge strip controller. The data structure also comprises a shelf label NFC identifier for each shelf label identifier defined for addressing by the server, said shelf label NFC identifier being used in NFC communication between the NFC reader of the shelf edge strip controller and the shelf label to address the NFC-enabled shelf label on the NFC communication level. Furthermore, the data structure can also comprise the time slot symbol which identifies or indicates the time slot which is defined for the shelf edge strip controller.

Furthermore, the shelf edge strip controller is designed, when there is a positive check result, to transfer data between the addressed shelf label and the access point in the time slot defined for it.

With regards to the processing of the data in the NFC sub-system, the considerations and mechanisms presented in connection with the above-explained embodiment can be used analogously.

The design of the shelf edge strip controller in the present case is such that the shelf edge strip controller has an energy-saving sleep state, in which it is not ready to communicate with the access point, and an active state, in which it is ready to communicate with the access point, and in that the shelf edge strip controller is designed to change from the sleep state to the active state promptly upon the occurrence of the time slot to which it itself is assigned. This means that a synchronous shelf edge strip controller is in the active state only a single time within a single time slot cycle, in order to check its synchronism and check whether it is addressed in the time slot defined for it. It is mentioned here that a plurality of shelf edge strip controllers can also be assigned to a single time slot and these can be addressed individually in spite of this.

In the present case, it is implemented on the server side that the server stores, in a database, a link between a controller identifier of a shelf edge strip controller and a shelf label identifier of the shelf label which is installed on the shelf edge strip of the shelf edge strip controller, and addresses a shelf label indirectly via the link between the shelf label identifier of the shelf label to be addressed and the controller identifier.

In this manner, the light-emitting unit control command can also be transmitted to the shelf label addressed by the server, in order to actuate the light-emitting unit there.

In contrast to the first embodiment, the second embodiment is no longer backwards-compatible with that of the aforementioned WO2015/124197, because the system according to WO2015/124197 does not have any possibility at all of storing and managing the controller identifier and using it for addressing the shelf labels. In contrast to this, however, the second embodiment is much more energy-efficient in comparison with the solution of WO2015/124197, but also in contrast to the solution according to the first embodiment, specifically even as soon as two or more shelf labels per shelf edge strip are installed. In the system of WO2015/124197, each shelf label must namely be in the active state at least once per time slot cycle in order to verify its synchronous state and then check whether it is addressed. The same applies for the first embodiment, wherein here the shelf edge strip controller must be in the active state twice per time slot cycle when two shelf labels assigned to different time slots are installed on its shelf edge strip. In contrast to this, it is sufficient in the present embodiment if the shelf edge strip controller is in the active state only once per time slot cycle in order to verify its synchronous state (and therefore also the "synchronous" state of its shelf labels) and subsequently check whether it is addressed. In particular, this is independent of how many shelf labels are installed on its shelf edge strip.

Particularly preferably, the shelf label comprises a chargeable, electrical energy storage device, preferably the aforementioned long-term energy storage device, and is designed to charge the energy storage device contactlessly with the aid of an NFC wireless signal of the NFC reader of the shelf edge strip controller. This realization fully exploits the potential of the NFC sub-system, because not only are addressing and data traffic handled via the NFC sub-system, but also the NFC sub-system ensures autonomous operation of the shelf labels even for time periods in which there is no NFC wireless signal, specifically without any outlay on cabling and/or maintenance, which would otherwise be necessary for replacing batteries and the disposal of spent batteries or the recharging of chargeable batteries.

It can be stated generally that in the present system, every access point installed in the system acts as a higher-level interface between the server or its software application and the shelf edge strip controller registered at the respective access point. At the shelf edge strip level, the NFC reader of the shelf edge strip controller assumes this interface function, said NFC reader acting as a lower-level interface between the shelf labels installed on its shelf edge strip and the access point to which the respective shelf edge strip controller, and thus also the respective NFC sub-system to which the NFC reader belongs, is logically (wirelessly) assigned.

In a business premises, for example of a supermarket, a plurality of access points can be installed, each access point being provided for communication with the shelf edge strip controllers logically assigned to it, which are located within a geographical region (within wireless range) around the access point.

If a plurality of shelf labels are arranged corresponding to a conductor loop of the shelf edge strip or a plurality of shelf labels are supplied with energy via a single conductor loop at the same time, precautions must be taken to ensure that the respective shelf label identifier or shelf label NFC identifier is received. To this end, the shelf labels can for example be programmed such that they output their identifier (once or multiple times) at randomly selected times within a time window in order to ensure individual receipt at the NFC reader of the shelf edge strip controller. An anti-collision method known for example from RFID technology can likewise be used during this contactless transfer in order to ensure individual receipt at the NFC reader of the shelf edge strip controller. In the technical jargon, the detection of the NFC-enabled shelf labels fastened to the shelf edge strip is referred to as running through a polling loop, wherein the NFC reader checks which shelf labels are present and detects their shelf label NFC identifier.

The shelf label identifier requested from the shelf label by the NFC reader is forwarded by the shelf edge strip controller, in a communication with the access point, to the server of the business premises, which server carries out and coordinates communication with the individual electronic shelf labels in order then to request data from them or transmit data to them.

The server also stores the logical link between products placed on the respective shelving unit and the shelf label (displays) positioned there and thus ensures that the respective shelf label display presents the information belonging to the product positioned corresponding to the shelf label.

The server can also be informed of the position or extent of the respective conductor loop on the shelf edge strip and can also be informed, by the respective NFC reader together with the shelf label identifier, of which conductor loop was used to acquire the shelf label identifier from the shelf label. Three-dimensional digital maps of the positions of all the shelf labels in a business premises can thus also be created. This relates both to the shelf labels (shelf label displays) configured to display information and analogously to the shelf labels which provide the other possible functionalities mentioned.

The electronics of the different devices or components and/or modules of the system and the interface thereof etc. can be realized with the aid of a wide variety of passive and active electronic components or functional units in a discrete or integrated manner. Preferably, a microprocessor with corresponding peripheral components or a microcontroller, upon which a software for providing the various functionalities is executed, is used in this case. Also, what are known as ASICs (Application-Specific Integrated Circuits) can be used.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
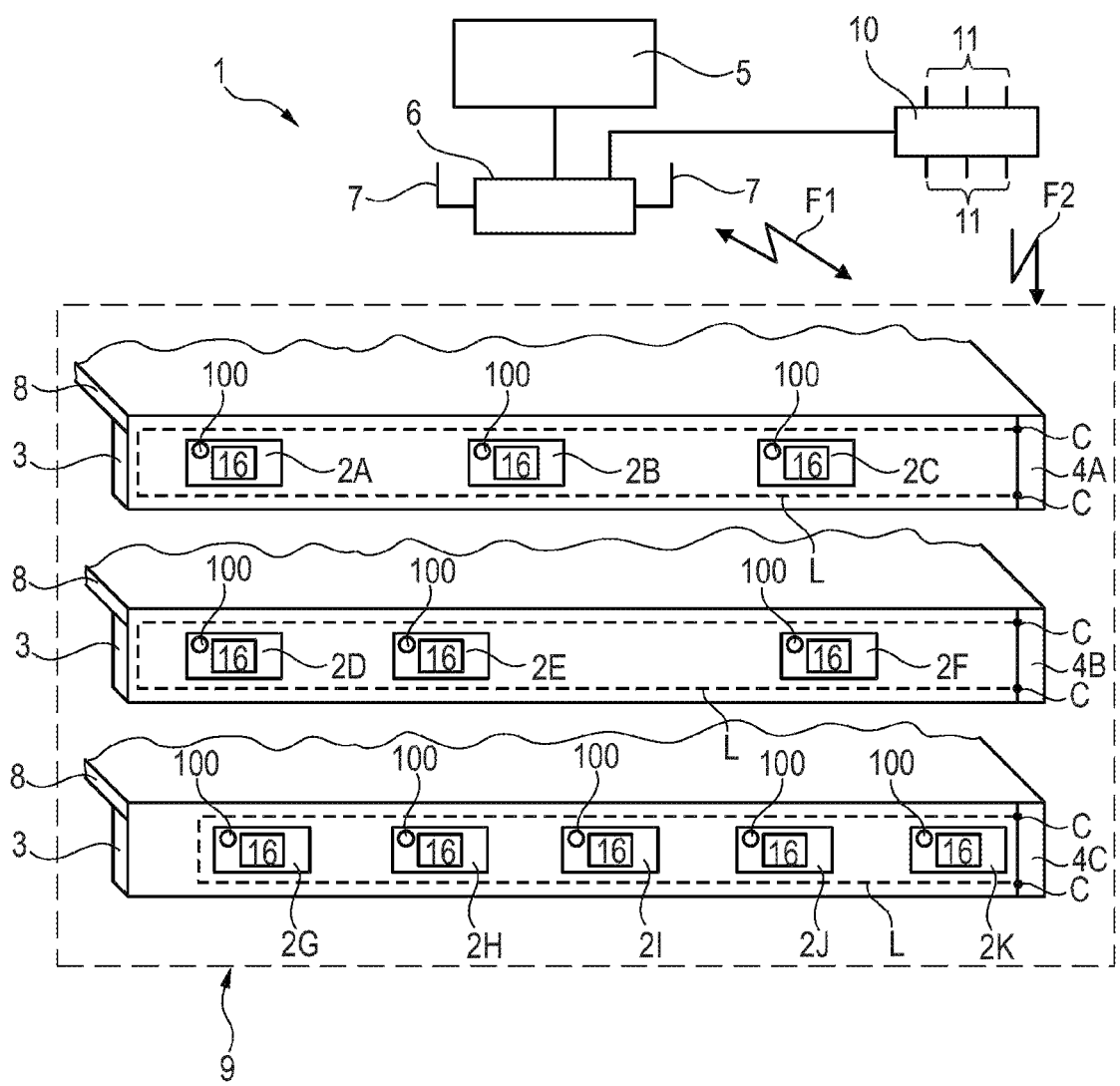
FIG. 1 schematically shows a detail of an electronic shelf label system according to the invention with shelf labels which comprise a light-emitting unit.

FIG. 1 illustrates a shelf label system 1, which comprises a number of identically constructed electronic NFC-enabled shelf labels 2A-2K realized as shelf label displays and fastened to three "intelligent" shelf edge strips 3. Each of the shelf labels 2A-2K comprises, on its front next to a screen 16, an LED 100 of a light-emitting unit 102 (see FIG. 2). Each of the shelf edge strips 3 comprises an NFC sub-system. A shelf edge strip controller 4A-4C is a constituent of each NFC sub-system. The shelf edge strip controller 4A-4C is inserted laterally into the shelf edge strip 3. Each shelf edge strip 3 furthermore comprises, as a constituent of the NFC sub-system, a conductor loop L, which extends along the entire length of the shelf edge strip 3, and the conductor loop connectors C of which are electrically conductively connected to the shelf edge strip controller 4A-4C. The conductor loop L forms the antenna of the respective NFC communication module of the shelf edge strip controller 4A-4C and is thus a constituent, integrated in the shelf edge strip 3, of the respective NFC sub-system. As soon as shelf labels 2A-2K are installed on the respective shelf edge strip 3 corresponding to the conductor loop L thereof and have been detected by the shelf edge strip controller 4A-4C there, these shelf labels 2A-2K also form a constituent of the respective NFC sub-system of the shelf edge strip 3.

The respective shelf edge strip controller 4A-4C assumes the role of a shelf edge strip controller for controlling the shelf labels 2A-2K installed on its shelf edge strip 3. In this case, the respective shelf edge strip controller 4A-4C communicates with the NFC-enabled shelf labels 2A-2K installed on its shelf edge strip 3 according to an NFC communication protocol. To this end, it sends an NFC wireless signal with the aid of the conductor loop L, said NFC wireless signal being used at the respective shelf label 2A-2K both for energy supply and for data transmission.

Also illustrated is a data processing device, which in the present case is realized with the aid of a server 5, which is connected in a wired manner to an access point 6, which comprises two antennas 7, for example.

The shelf edge strip controllers 4A-4C are furthermore designed such that they are in wireless contact with the access point 6 via first wireless signals F according to a proprietary time slot communication method. Thus, for example, image contents of the shelf labels 2A-2K can be changed from the server 5, where necessary also associated status information can be requested from the shelf labels 2A-2K and transmitted to the server 5. Therefore, light signals can furthermore be generated from the server with the aid of light-emitting unit control commands.

Each of the shelf edge strips 3 is mounted on the front edge of an individual shelf 8. The three shelves 8 illustrated all belong to a shelving unit 9 indicated only very schematically. Different products can be placed on the shelves 8 but in the present case are not illustrated for reasons of simplicity.

Furthermore, the shelf edge strip controllers 4A-4C are designed such that they can for their part be supplied with energy with the aid of a second wireless signal F2. To this end, the system 1 comprises a supply transmitter 10 (also referred to as a wireless energy source), which is designed to transmit electrical energy at a certain transmitting power, such as 5 W for example, to a receiver (that is to say, to one of the shelf edge strip controllers 4A-4C) with the aid of the focussed or directed (second) wireless signal F2. Such a supply transmitter 10 also comprises a multiplicity of antennas 11 (in this case, six units are illustrated), with the aid of which the direction of the energy transmission (ultimately the propagation of the second wireless signal F2) can be set relatively precisely so that the second wireless signal F2 transmitting the energy arrives precisely at the respective shelf edge strip controller 4A-4C. This energy transmission is known under the term "power over WiFi".

It should also be mentioned at this point that, for reasons of simplicity, only one single access point 6 and one single shelving unit 9 have been visualized, but a multiplicity of such system components are present in a real environment of a supermarket. In that case, a single access point 6 would wirelessly supply a multiplicity of shelving units 9 within its environment.

A block diagram of the shelf labels 2A-2K is explained in the following using FIG. 2, wherein the reference sign 2 has been used for the identically constructed shelf labels 2A-2K for the sake of simplicity.

The block diagram shows a first NFC interface 12 with its coupling coil or antenna 13. With the aid of the coupling coil 13, the NFC wireless signal can be received by another NFC-enabled device, in the present case the shelf edge strip controller 4A-4C. To this end, the coupling coil 13 must be positioned correspondingly close (a few tenths of a millimetre to approximately 4 millimetres) to the conductor loop L, which is the case with the shelf labels 2 fastened to one of the shelf edge strips 3. While the NFC wireless signal exists, a first supply voltage VCC1 (relative to a local first reference potential GND1) for operating the entire shelf label 2 is generated with the aid of the NFC interface 12.

Specifically, the first NFC interface 12 comprises electronics 12A which are designed for generating the first supply voltage VCC1 and for providing the NFC communication capability. Furthermore, the electronics 12A comprise a long-term energy storage device, realized in the present case as a supercap 12B, with the aid of which the first supply voltage VCC1 can be maintained even in the absence of the NFC wireless signal, over longer periods than would be the case with the aid of a smoothing capacitor or backup capacitors (neither of which is illustrated). The shelf label 2 can thus be operational and execute tasks, such as detecting temperature or user inputs according to the design, even in the absence of the NFC wireless signal. The supercap 12B is charged with the aid of the electronics 12A when the NFC wireless signal is present. In the present context, it is used predominantly for the energy supply of an LED 100, which is used to also emit a light signal that can be seen well during a period of absence of the NFC wireless signal.

As soon as the electronics 11A have been activated with the aid of the NFC wireless signal, the first NFC interface 12 is also available for contactless bidirectional communication of data D. A constituent of these electronics 12A is an NFC tag controller, which provides the entire NFC functionality, is not illustrated here in detail however, but is integrated in the first NFC interface 12.

This NFC tag controller is also programmed in such a manner that it processes the light-emitting unit control command, wherein it emits a control signal LEDS for the LED 100 at one of its control outputs. This control signal LEDS is then stored with the aid of a bistable flip-flop 101, which is a constituent of the light-emitting unit 102 and is likewise supplied with the aid of the supercap 12B, so that the stored state is also present during the absence of the NFC wireless signal to actuate the LED 100. Therefore, the LED 100 can in a simple manner be switched on (that is to say supplied with power)—e.g. by transmitting the light-emitting unit control command—and later switched off again (that is to say the power supply is stopped)—e.g. by repeated transmission of the light-emitting unit control command— specifically without the NFC wireless signal having to be present in the meantime uninterrupted to supply the LED 100 and the flip-flop 101. In this simple variant, the light-emitting unit control command does not even contain further parameters.

The block diagram also shows a display unit 14, which is connected to the first NFC interface 12 and is divided into an electronic paper display controller 15, EPD controller 15 for short, and the electronic paper display screen 16 which can be controlled therewith. With the aid of the EPD controller 15, the data received via the first NFC interface 12 are interpreted, the image contents of the screen 16 are changed accordingly, where necessary, or else status information in the form of data D are output to the shelf edge strip controller 4A-4C via the first NFC interface 12.

A block diagram of the shelf edge strip 3 is explained below using FIG. 3. Analogously to the description of the shelf labels 2A-2K, the reference numeral 4 has been used for the identically constructed shelf edge strip controllers 4A-4C in this case too.

Figure 3:
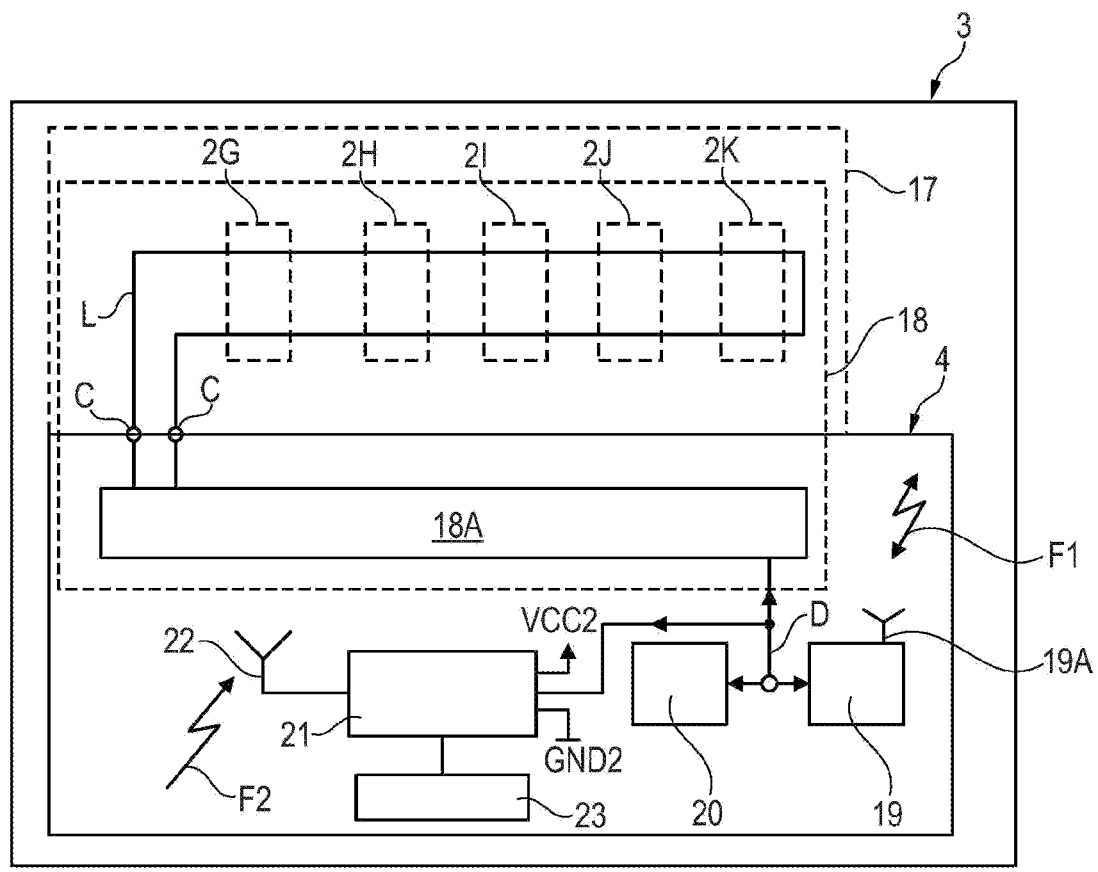
FIG. 3 schematically shows an exemplary embodiment of the shelf edge strip as a block diagram with an NFC sub-system.

In FIG. 3, it is indicated that the shelf edge strip 3 supports the shelf labels 2G-2K and is therefore the shelf edge strip 3 illustrated at the bottom of FIG. 1. The shelf labels 2G-2K are positioned corresponding to the position of the conductor loop L. In contrast to FIG. 1, the electrical connection of the loop connectors C to second electronics 18A of the shelf edge strip controller 4 can be seen. The conductor loop L forms, together with the second electronics 18A, a second NFC interface 18 (or NFC wireless communication module, also termed NFC reader 18 for short) of the shelf edge strip controller 4. In this case too, the second electronics 18A comprise their own NFC reader controller (not illustrated), which provides the entire NFC reader functionality. With the aid of the second NFC interface 18, the NFC wireless signal can be generated and output, and thus electrical energy can be transmitted contactlessly to the shelf labels 2G-2K, and bidirectional communication of data with them can be carried out.

It should be emphasized at this point that although the conductor loop L is a constituent of the NFC reader 18, it is accommodated outside the shelf edge strip controller 4 in the mechanical structure of the shelf edge strip 3. This is symbolized by a structure 17 of the shelf edge strip 3, which encloses the conductor loop L and adjoins the shelf edge strip controller 4.

The shelf edge strip controller 4 furthermore comprises an access point communication module 19, which is designed for wireless communication with the access point 6 illustrated in FIG. 1. To this end, the access point communication module 19 comprises electronics (not illustrated in detail) designed therefor and an antenna configuration 19A, which can also comprise multiple antennas. To control the internal processes and communication with the access point 6 according to the aforementioned proprietary time slot communication method, the shelf edge strip controller 4 comprises a control unit 20. The control unit 20 is realized with the aid of a microcontroller, which is connected to the second NFC interface 18 and the access point communication interface 19 via a bidirectional data bus.

Figure 2:
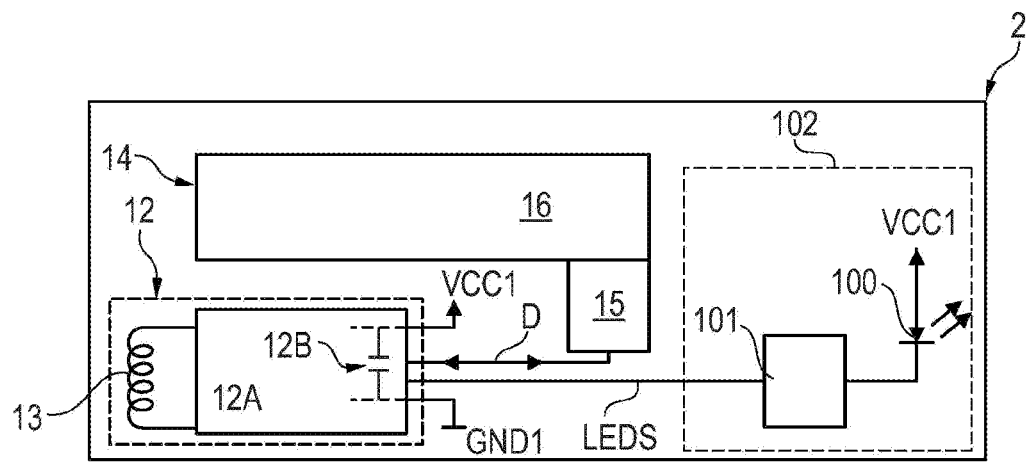
FIG. 2 schematically shows an exemplary embodiment of a shelf label as a block diagram.

For the case that the light-emitting unit 102 should be contained in the shelf edge strip controller 4, only the light-emitting unit 102 provided according to FIG. 2 would have to be installed in the shelf edge strip controller 4 and the control unit 20 would have to be designed (in terms of hardware and programmed) in such a manner that it detects the light-emitting unit control command addressed to it and accordingly generates the control signal LEDS. The same applies, mutatis mutandis, even if the LED(s) 100 of the light-emitting unit 102 is (are) installed on the shelf edge strip 3 or an LED strip is installed on the shelf edge strip 3, wherein in these cases, corresponding electrical connections (plug and cable or conducting tracks on a printed circuit board) are to be provided.

To realize the "power over WiFi" energy transmission, the shelf edge strip controller 4 comprises a supply receiver 21 which is suitable for receiving the second wireless signal F2 and is equipped with its antenna configuration 22 (which can have multiple antennas) and electronics (not illustrated in detail), which are designed to receive the second wireless signal F2 and to store the energy transmitted therewith in an internal electrical energy storage device 23 (chargeable battery, rechargeable battery or supercap, etc.) and thus to generate a second supply voltage VCC2 in relation to a second reference potential GND2 for the electrical supply of the shelf edge strip controller 4.

The control unit 20 is also connected by its data bus to the supply receiver 21.

During operation, the shelf edge strip controller 4 can query or monitor the state of charge of the energy storage device 23, for example with the aid of the control unit 20 of the NFC reader. As soon as the state of charge falls below a certain level, the control unit 20 can request a (re)charge with the aid of the first wireless signal F1. This request is received by the access point 6 and can be forwarded directly to the supply transmitter 10 or forwarded to the supply transmitter 10 by involving the server 5, depending on the implementation. Since the exact geographical position (the three-dimensional coordinates) of each of the shelf edge strip controllers 4A-4C within the business premises and their unique controller identifier is known in the system 1 (e.g. the server 5), the supply transmitter 10 can send the second wireless signal F2 in a precisely directed manner towards the position of the respective shelf edge strip controller 4 requesting charging. The second wireless signal F2 is received there, and the energy thus transmitted is used to charge the internal energy storage device 23.

The shelf edge strip 3 described here is therefore designed, with the aid of its NFC sub-system, for contactless communication with the shelf labels 2 installed on it and with an access point 6 assigned wirelessly to it and for contactless provision of energy within the meaning of energy storage for the shelf edge strip controller's 4 own operation and for the contactless energy supply of the respective shelf labels 2A-2K.

It should also be mentioned at this point that the supply transmitter 10 can also be installed in the access point 6.

Figure 4:
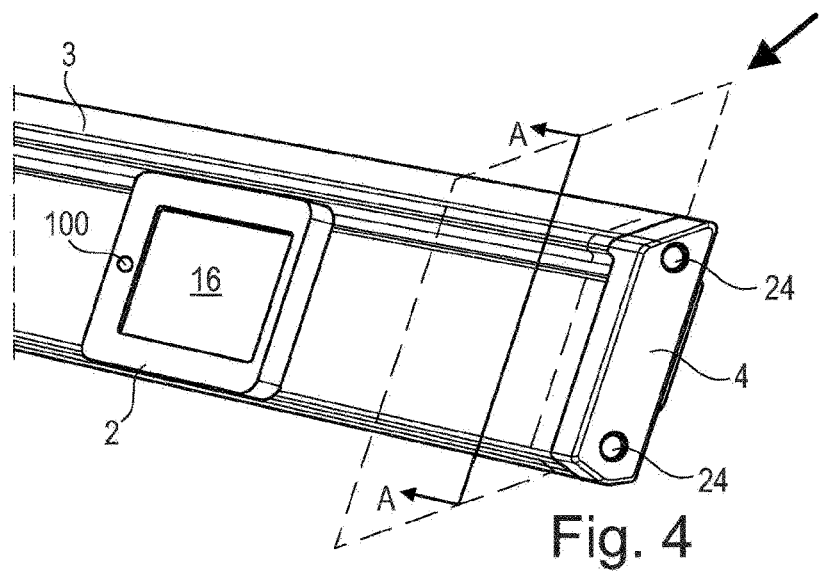
FIG. 4 schematically shows a shelf edge strip with a shelf label in a perspective view.

The structure of the "intelligent" shelf edge strip 3 is discussed below using FIGS. 4-6. FIG. 4 thus shows a shelf edge strip 3 with a shelf label 2 fastened to it, with LED 100, which can be seen on the housing frame enclosing the screen 16, and with the shelf edge strip controller 4 inserted laterally into the shelf edge strip 3 and fastened in the structure of the shelf edge strip 3 with screws 24. This shelf edge strip 3 has a length of approximately 3 m, a height of approximately 4.5 cm and a thickness of 1.2 cm, for example.

Figure 5:
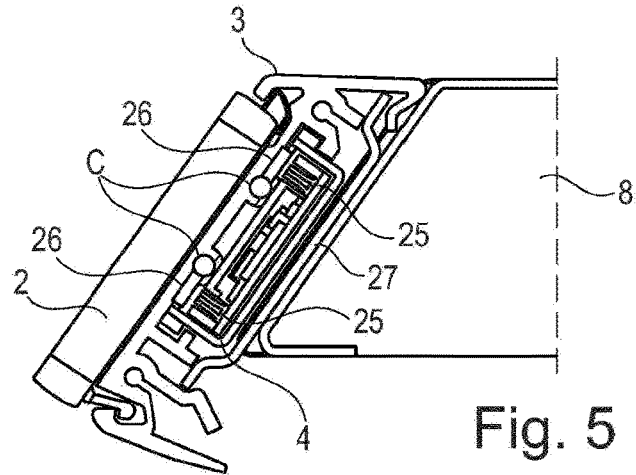
FIG. 5 schematically shows a sectional illustration of the shelf edge strip.

FIG. 5 shows a section through the shelf edge strip 3 according to a sectional plane A-A drawn in FIG. 4, which is oriented transversely (normal to the front of the shelf edge strip 3) through the shelf edge strip 3 and runs at the point at which contact elements 25 of the shelf edge strip controller 4 are formed, which are used to contact the conductor loop L of the shelf edge strip controller 4 running in the shelf edge strip 3. In this view, the contact elements 25 make contact with contact tabs 26, which are for their part in contact with the conductor loop connectors C. The contact tabs 26 can however be omitted if a different geometry is selected, so that the conductor loop connectors C can also be contacted directly with the contact elements 25. A shielding plate 27 constructed on the rear side of the shelf edge strip 3 can furthermore be seen and likewise extends along the entire shelf edge strip 3 analogously to the conductor loop L.

Figure 6:
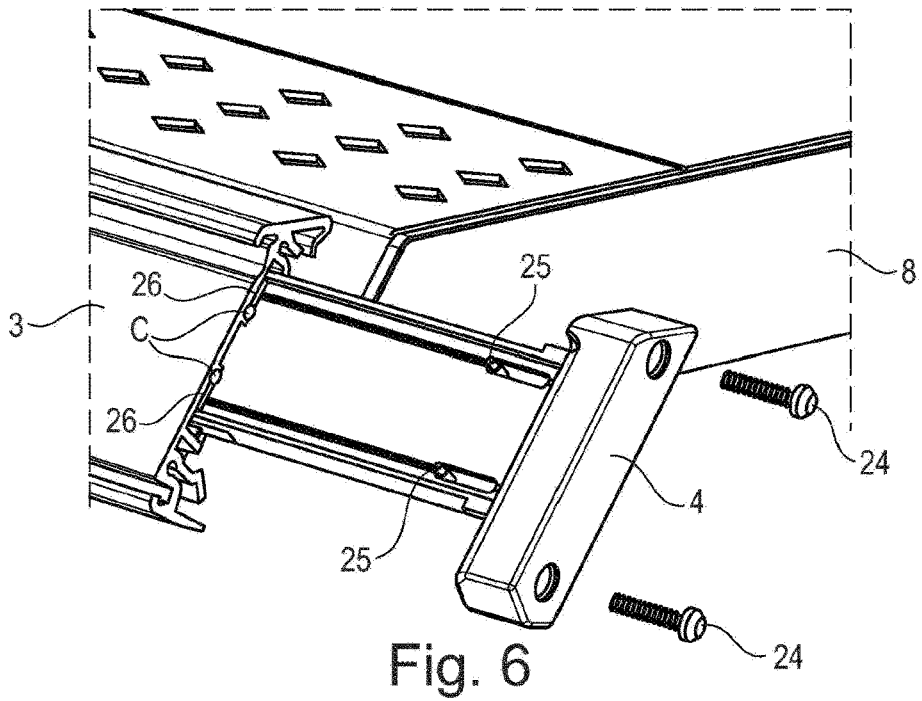
FIG. 6 schematically shows an exploded view of the shelf edge strip.

FIG. 6 shows the shelf edge strip controller 4 fastened to a rail or sliding mechanism, the sliding mechanism being partially drawn out of a shaft, designed for receiving it, in the shelf edge strip 3.

Figure 7:
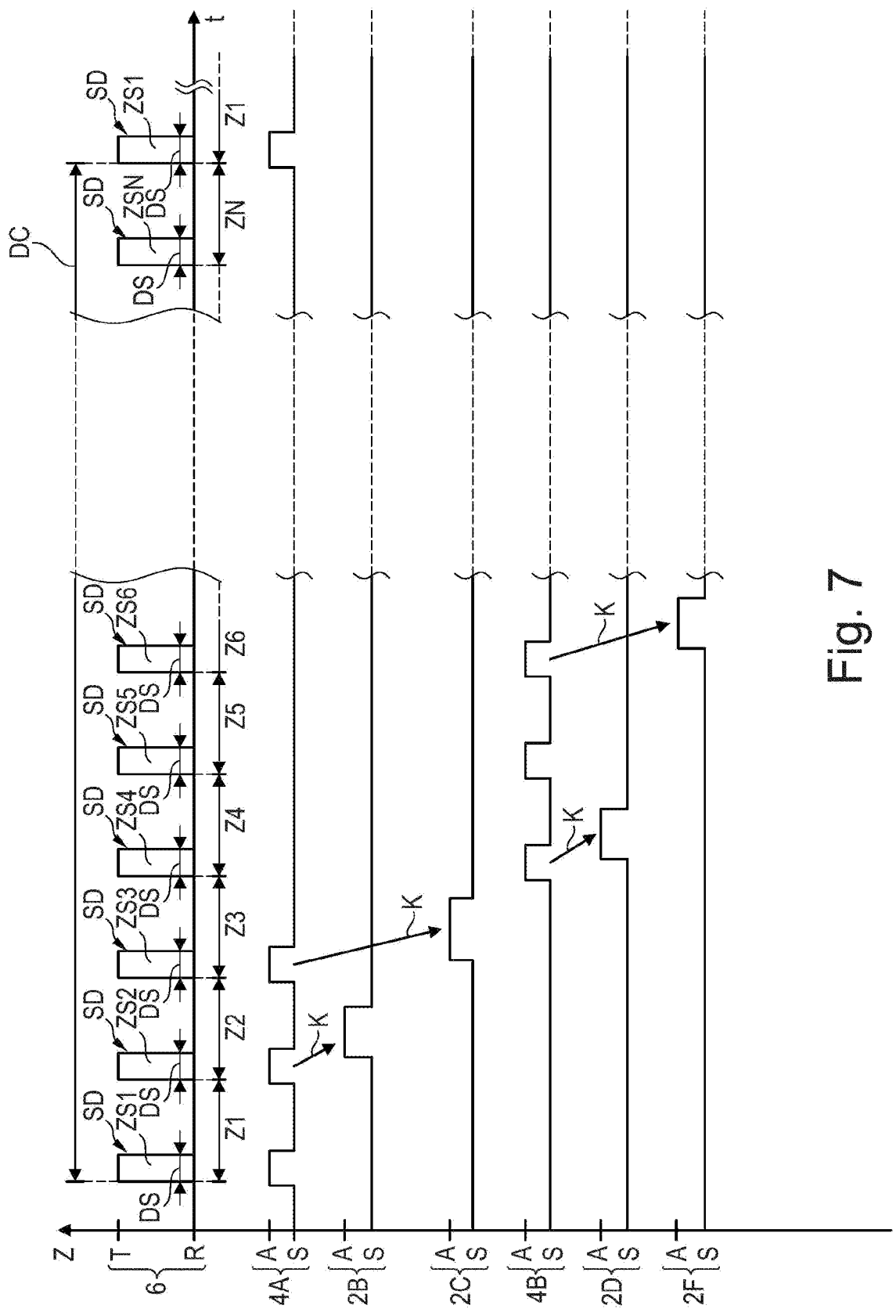
FIG. 7 schematically shows a state diagram of system component activities according to a first exemplary embodiment.
Figure 8:
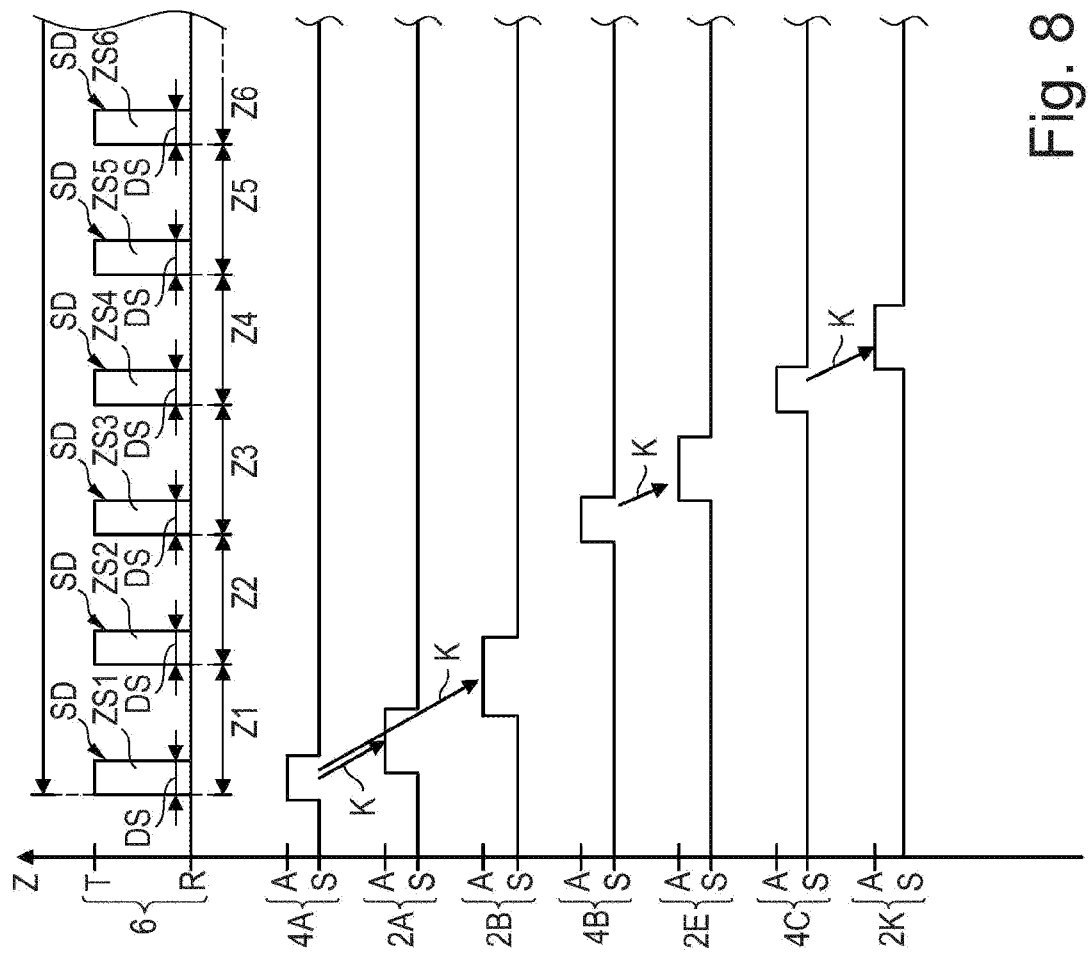
FIG. 8 schematically shows a state diagram of system component activities according to a second exemplary embodiment.

The addressing of the shelf labels 2 is discussed in the following with reference to FIGS. 7-8. FIGS. 7-8 each show a state diagram with the time t being plotted on the abscissa and states Z of the system components being plotted on the ordinate.

FIG. 7 shows a chronological system in the time slot communication method, in which N time slots Z1 . . . ZN (e.g. 256) with an identical time slot duration DS (e.g. approximately 58 milliseconds) are available in a continuously repeating manner within a time slot cycle duration DC (e.g. 15 seconds). During the time slot cycle duration DC, the access point 6 changes between a transmitting state T and an idle state R. The transmitting state T is always assumed at the start of a time slot Z1 . . . ZN and is maintained for a synchronization data signal duration DSD (or transmission time duration DSD) of the synchronization data signal SD In order to transmit the respective applicable time slot symbol ZS1, ZS2, . . . ZSN with the respective synchronization data signal SD. The serial number of the respective time slot Z1 . . . ZN in the order of occurrence of the time slot Z1 ... ZN is used as the respective time slot cycle symbol ZS1 . . . ZSN.

In order to address one of the shelf labels 2A-2K individually and where necessary also supply it with data, address data AD and where necessary also command data CD, particularly the light-emitting unit control command, are embedded in the synchronization data signal SD of the relevant time slot Z1-ZN by the access point 6. Therefore, the LEDs 100 of the addressed shelf labels 2A-2K can optionally be activated, that is to say caused to illuminate by power supply, or deactivated, so that they do not emit any light.

In the present exemplary embodiment, it is assumed that all the shelf edge strip controllers 4A-4C are registered wirelessly at the access point 6 and can therefore communicate with it according to the time slot communication method. Each of the shelf edge strip controllers 4A-4C has initially detected the shelf labels 2A-2C, 2D-2F and 2G-2K attached to its shelf edge strip 3 with the aid of an NFC polling loop and stored their individual shelf label NFC identifier in order to carry out NFC communication with them. In addition, each shelf edge strip controller 4A-4C stores which of the shelf labels 2A-2C, 2D-2F and 2G-2K attached to its shelf edge strip 3 is assigned to which of the time slots Z1-ZN. This data structure, stored in the shelf edge strip controller 4A-4C, for assigning the shelf labels 2A-2K also uses the server 5 to address the shelf labels 2A-2K individually, in which case multiple shelf labels 2A-2K can also be assigned to one single time slot Z1-ZN.

It is thus assumed in the present case that, for example, the shelf labels 2A-2C are assigned chronologically to the first three time slots Z1-Z3. The entries in the data structure of the shelf edge strip controller 4A then prompt it to change from its sleep state S to its active state A promptly upon the occurrence of the synchronization data signal SD of the first, second and third time slots Z1, Z2 and Z3. It can be advantageous here if the duration of the active state is slightly longer than the synchronization data signal duration DSD. In the active state, the relevant synchronization data signal SD is received, the shelf edge strip controller 4A establishes its synchronism on the basis of the time slot symbol ZS1, ZS2 and ZS3 contained in the respective synchronization data structure SD and checks whether the shelf label 2A, 2B or 2C assigned to the respective time slot Z1, Z2 or Z3 is addressed individually by the server 5 with the aid of the address data AD.

In the present case, it is assumed that the shelf labels 2B and 2C are addressed, which leads to NFC communication, delayed in the present case, between the shelf edge strip controller 4A and the two shelf labels 2B and 2C, which is visualized by the arrows K. First, the NFC wireless signal is generated, and the first supply voltage VCC i is generated. This results in the respective shelf label 2B or 2C leaving its sleep state S and changing to its active state A. Then, the respective command data CD, in the present case respectively a light-emitting unit control command for activating the LED 100, are transmitted to the addressed shelf label 2B and 2C and processed there, which leads to an activation of the LEDs 100 there.

The second shelf edge strip controller 4B behaves analogously, the shelf labels 2D, 2E and 2F of which are assigned to the fourth to sixth time slots Z4, Z5 and Z6, wherein in the present case, it is assumed that only the fourth and the sixth shelf labels 2D and 2F are addressed, so that also only the LEDs 100 provided there are activated.

The same applies analogously for the third shelf edge strip controller 4C, wherein in this case, it is assumed that none of its shelf labels 2G-2K is addressed, so that all of the LEDs 100 remain deactivated there.

The shelf labels 2A, 2E and 2G-2K which are not addressed therefore all remain in their energy-saving sleep state S within the time slot cycle visualized. For these shelf labels 2A, 2E and 2G-2K which are not addressed, the previous state (activated/deactivated) of the LEDs 100 remains unchanged. The shelf edge strip controllers 4A-4C also remain in their sleep state S in time slots Z1-ZN for which no shelf labels assigned to the respective time slot Z1-ZN are recorded in the data structure.

It is furthermore mentioned that the shelf edge strip controller 4A-4C can also be in the active state A continuously or multiple times within the respective time slot Z1-ZN, if, for example an acknowledgement from the respective shelf label 2A-2K must take place within the relevant time slot or also additional data are to be transmitted with the affected shelf label 2A-2K within this time slot. Data transmissions between the access point 6 and the respective shelf edge strip controller 4A-4C can also extend over multiple time slots Z1-ZN, which can lead to the active state A being present multiple times at the affected shelf edge strip controller 4A-4C within the time slot cycle.

Data transmission within the NFC sub-system can also take place in real time in the respective time slot when addressing of a shelf label 2A-2K is detected, that is to say, not with a time delay with respect to the respective time slot as shown in FIG. 7.

Once activated, LEDs 100 may remain activated until the next addressed transmission of a light-emitting unit control command for their deactivation. Likewise, it is possible that the light-emitting unit control command contains parameters, which relate to the duration of the activated state of the LEDs, a light signal sequence or else the repetition frequency, etc. of such signal sequences, so that no further light-emitting unit control command is necessary for their deactivation, because this automatically takes place after processing of the parameters. These procedures are controlled in the respective shelf label e.g. by the NFC tag controller, which is also supplied with energy with the aid of the supercap 12B. A signalling controller of its own may also be provided, which is programmable with the aid of the light-emitting unit control command and then controls the signalling independently of the NFC tag controller. Therefore, a comprehensive light signalling behaviour of the shelf labels 2A-2K can be programmed.

In contrast to the exemplary embodiment explained above, it is now assumed according to a further (second) exemplary embodiment and visualized with the aid of FIG. 8 that each of the shelf edge strip controllers 4A-4C is assigned to a certain time slot Z1-ZN, for example, the first shelf edge strip controller 4A is assigned to the first time slot Z1, the second shelf edge strip controller 4B is assigned to the third time slot Z3, and the third shelf edge strip controller 4C is assigned to the fourth time slot Z4. The assignment of the shelf labels 2A-2K to the respective time slots Z1-ZN necessarily results only by means of this assignment of the shelf edge strip controller 4A-4C to the respective time slots. In this case, therefore, the shelf labels 2A-2C are assigned to the first time slot Z1, the shelf labels 2D-2F are assigned to the third time slot Z3, and the shelf labels 2G-2K are assigned to the fourth time slot Z4. To be able to address a shelf label 2A-2K within this system 1, the server 5 must know which shelf edge strip controller 4A-4C can wirelessly operate which shelf label 2A-2K in an NFC communication in order then to address the shelf label 2A-2C, 2D-2F or 2G-2K available there indirectly via the addressing of the respective shelf edge strip controller 4A-4C in the time slot communication method. This assignment is stored in a database of the server 5. The data structure of the shelf edge strip controller 4A-4C stores the time slot symbol ZS1-ZSN of the time slot Z1-ZN to which the relevant shelf edge strip controller 4A-4C is assigned and the addresses (shelf label identifiers) of the shelf labels 2A-2C, 2D-2F or 2G-2K that can be addressed via it. In this case too, the shelf label NFC identifiers for NFC communication are stored in the NFC sub-system.

The entries in the data structure of the first shelf edge strip controller 4A then cause it to change from its sleep state S to its active state A promptly upon occurrence of the synchronization data signal SD of the first time slot Z1, to establish its synchronism and to check whether it is addressed by the server 5 for the purpose of indirect addressing of shelf labels. If this is the case, it is further checked whether the server 5 also addresses one of the shelf labels 2A-2C and, if this addressing is present, data traffic is handled where necessary in a local NFC communication in the NFC sub-system with this addressed shelf label. In the present case, it is assumed that only the shelf labels 2A and 2B were addressed within the time slot cycle visualized, which leads to a sequential NFC communication in the NFC sub-system with the shelf labels 2A and 2B, which is visualized by means of the arrows K. Here, the LEDs 100 of these shelf labels can be activated as explained previously.

The same applies, mutatis mutandis, for the second shelf edge strip controller 4B, which changes from its sleep state S to its active state A within the period of the occurrence of the synchronization data signal SD of the third time slot Z1, establishes its synchronism and carries out its check as to whether it is addressed by the server 5 for the purpose of indirect addressing of shelf labels. It is assumed here that only the fifth shelf label 2E is addressed, which leads to an NFC communication with this in the NFC sub-system. Also, in this case, the LED 100 of the shelf label 2E can be activated as explained previously.

The situation is similar with the third shelf edge strip controller 4C, the entries of which in its data structure cause it to change from its sleep state S to its active state A promptly upon occurrence of the synchronization data signal SD of the fourth time slot Z4, to establish its synchronism and to check whether it is addressed by the server 5 for the purpose of indirect addressing of shelf labels, in order to address one of its shelf labels 2G-2K in succession when such an addressing is present. It is assumed here that only the eleventh shelf label 2K was addressed, which leads to an NFC communication with this in the NFC sub-system. Also, in this case, the LED 100 of the shelf label 2E can be activated as explained previously.

As can be seen if the state diagrams of FIGS. 7 and 8 are compared, the shelf edge strip controllers 4A-4C have to be active less often in each time slot cycle in the implementation according to the second exemplary embodiment, which means that, in the comparison of the two exemplary embodiments, the second exemplary embodiment prevails over the first exemplary embodiment in terms of energy efficiency.

With regards to a deactivation of the LEDs 100 and emission of light signal sequences, reference is made at this point to the explanations for the preceding exemplary embodiment.

Figure 9:
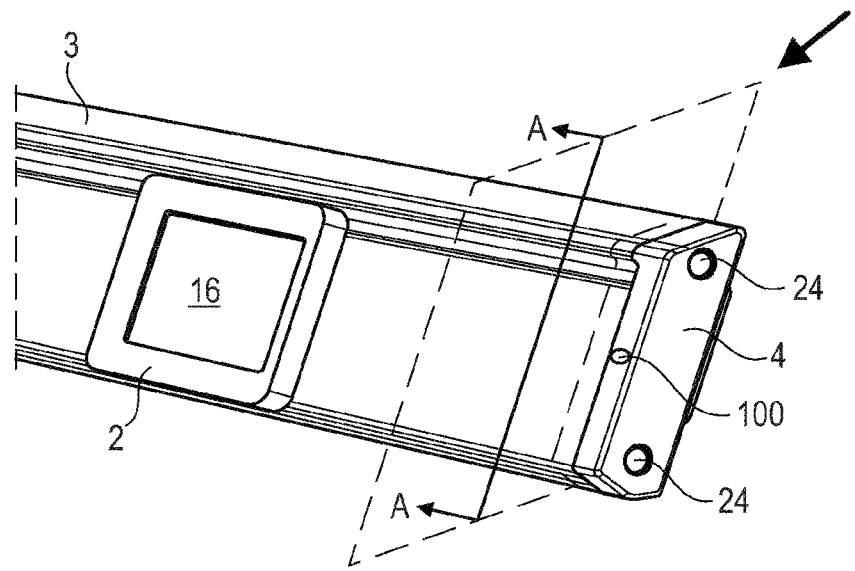
FIG. 9 schematically shows the shelf edge strip with a shelf edge strip controller which comprises a light-emitting unit.

Furthermore, FIG. 9 shows a shelf edge strip 3, in which the shelf edge strip controller 4 comprises an LED 100, which can be activated or deactivated analogously to the previously explained exemplary embodiments. In the present case, it is advantageous that the shelf edge strip controller 4 is assigned to a time slot and this assignment is also known to the server 5. Therefore, each of the shelf edge strip controllers 4 can be addressed individually by the server with the aid of the time slot communication method and the light emission of the LED 100 can consequently be controlled with the aid of the light-emitting unit control command directed to the addressed shelf edge strip controller 4. The hard- and/or software measures explained in connection with the shelf labels 2 are then used in the shelf edge strip controller 4 for the purpose of implementing the light-emitting unit control command.

Figure 10:
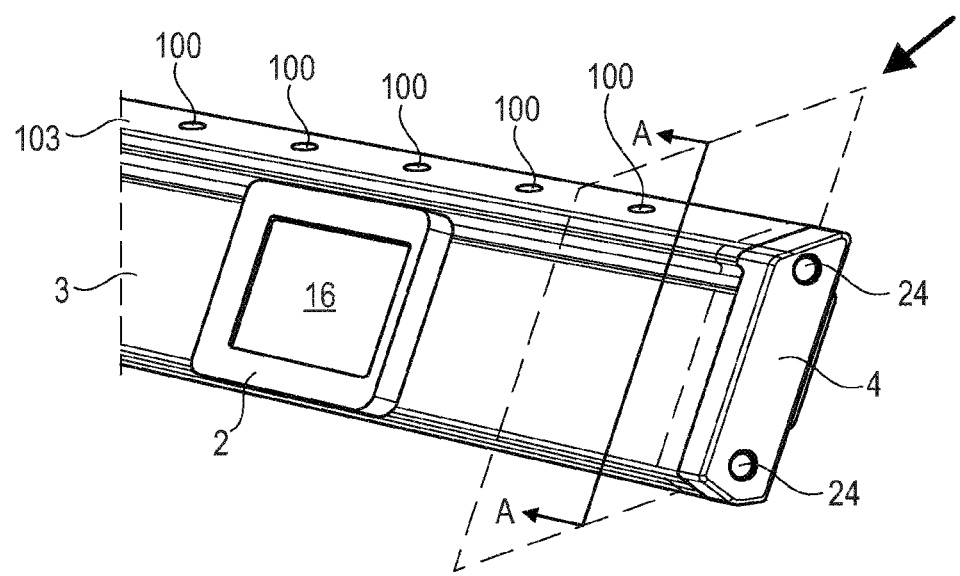
FIG. 10 schematically shows the shelf edge strip with a light-emitting unit as light-emitting diode strip.

Furthermore, analogously to FIG. 4, FIG. 10 shows the shelf edge strip 3, wherein in the present case, an LED strip 103 with a multiplicity of the LEDs 100 is installed on its upper side, wherein the LED strip 103 is fastened (e.g. adhesively bonded or screwed) to the shelf edge strip and the LEDs 100 are electrically conductively connected, e.g. by means of a plug connection (not illustrated in detail) to the shelf edge strip controller 4. Here, analogously to the explanations of the exemplary embodiment according to FIG. 9, all LEDs 100 can be activated and deactivated together. This can be used to visually highlight an entire shelf edge strip 3.

At this point, it is furthermore mentioned that according to a further exemplary embodiment, which is not visualized, the LEDs 100 of the LED strip 103 can be actuated individually. This requires a corresponding number of control outputs in the hardware of the shelf edge strip controller, which have to be connected to the individual LEDs 100 or else to groups of these LEDs 100.

Furthermore, it is mentioned that the shelf edge strip controller 4A-4C can also transmit a feature identifier e.g. to the server 5 when the shelf edge strip controller is registered at the access point 6. This feature identifier may be e.g. a type number, by means of which the server 5 can identify the features which the relevant shelf edge strip controller 4A-4C provides. Using this type number, the server 5 can e.g. differentiate, whether a shelf edge strip controller 4A-4C comprises an LED 100 installed in its housing or whether an LED strip 103 is connected to it or otherwise no direct actuation of a light-emitting unit 102 is possible. Instead of the type number, a list of features may also be transmitted, in which the relevant shelf edge strip controller 4A-4C explicitly specifies its available features.

Analogously, each of the shelf labels 2A-2K can also list the features available for it (e.g. light-emitting unit, EDP, temperature sensor, camera, etc.) either directly via the said feature list or disclose the same with the aid of its type number.

With the aid of the explained technical measures, due to the targeted use of the light-emitting units 102, particularly a use of the light-emitting units 102 in a supermarket such that they are coordinated or tuned to one another, a very wide range of applications can be realized, in which e.g. people in a business premises are guided by light signals (e.g. pick & collect activities) or else light signals are used for a camera-assisted, particularly automatic, recognition or detection of e.g. positions of a shelf edge strip 3 or else products or shelf labels 2A-2K.

Finally, it is once more pointed out that the figures previously described in detail are only concerned with exemplary embodiments, which can be modified in many different ways by the person skilled in the art, without departing from the scope of the invention. For the sake of completeness, it is also pointed out that the use of the indefinite article "a" or "an" does not mean that the relevant features cannot also be present multiple times.

The invention claimed is:
1. An electronic shelf label system (1),
wherein the system comprises a near-field communication, NFC for short, sub-system on a shelf edge strip (3) of a shelving unit (9), which is characterized in that
the shelf edge strip (3) comprises a shelf edge strip controller (4A-4C), wherein
the shelf edge strip controller (4A-4C) comprises a first wireless communication module (19), which is designed for wireless communication according to a first communication method with an access point (6) for the purpose of data transmission with a server (5) of the shelf label system (1), and wherein
the shelf edge strip controller (4A-4C) comprises an NFC-enabled second communication module (18) for NFC-based energy supply and communication with at least one NFC-enabled shelf label (2A-2K), which can be fastened to the shelf edge strip (3), and
the shelf edge strip (3) comprises at least one conductor loop (L) constructed on it and connected to the NFC-enabled second communication module (18), wherein the conductor loop (L) is used for NFC communication with the NFC-enabled shelf label (2A-2K), wherein
the shelf edge strip (3) comprises a light-emitting unit (102), and
the shelf edge strip controller (4A-4C) is constructed for actuating the light-emitting unit (102) as a consequence of the data transmission, wherein
the access point (6) and the shelf edge strip controller (4A-4C) are designed for wireless communication according to a time slot communication method, wherein in the time slot communication method, a number of time slots (Z1-ZN) in a repeating sequence per time slot cycle are available for communication, and wherein each of the shelf edge strip controllers (4A-4C) is assigned to a certain time slot (Z1-ZN).

2. The electronic shelf label system (1) according to claim 1, wherein the light-emitting unit (102) is formed by at least one light-emitting diode (100).

3. The electronic shelf label system (1), according to claim 1, wherein the shelf edge strip controller (4A-4C) comprises the light-emitting unit (102).

4. The electronic shelf label system (1) according to claim 1, wherein the shelf edge strip (3) comprises the light-emitting unit (102) and the light-emitting unit (102) is electrically conductively connected to the shelf edge strip controller (4A-4C) for the purpose of actuation.

5. The electronic shelf label system (1) according to claim 4, wherein the light-emitting unit (102) is constructed as a light-emitting diode strip (103) and extends along the length of the shelf edge strip (3).

6. The electronic shelf label system (1) according to claim 5, wherein the light-emitting diode strip (103) comprises light-emitting diodes (100) that can be actuated individually and the shelf edge strip controller (4A-4C) is designed to actuate the light-emitting diodes (100) individually.

7. The electronic shelf label system (1) according to claim 1, wherein the NFC-enabled shelf label (2A-2K) is fastened to the shelf edge strip (3) corresponding to the conductor loop (L) and the shelf label (2A-2K) comprises the light-emitting unit (102), wherein the shelf label (2A-2K) is designed in such a manner that the actuation of the light-emitting unit (102) takes place in the course of an NFC communication with the shelf edge strip controller (4A-4C).

8. The electronic shelf label system (1), according to claim 1, wherein the shelf label (2A-2K) comprises a reflective screen (16).

9. The electronic shelf label system (1) according to claim 1, wherein each time slot (Z1-ZN) is identified by a unique time slot symbol (ZS1-ZSN).

\* \* \* \* \*